United States Patent [19]

Tsunekawa et al.

[11] 4,366,501
[45] Dec. 28, 1982

[54] IMAGE RECORDING SYSTEM

[75] Inventors: Tokuichi Tsunekawa, Yokohama; Nobuaki Date; Hiroshi Aizawa, both of Kawasaki; Kazuya Hosoe, Machida; Kazunori Urushibara, Yokohama, all of Japan

[73] Assignee: Canon Kabushiki Kaisha, Tokyo, Japan

[21] Appl. No.: 31,168

[22] Filed: Apr. 18, 1979

[30] Foreign Application Priority Data

Apr. 23, 1978 [JP] Japan ................. 53-48010
Apr. 23, 1978 [JP] Japan ................. 53-48011

[51] Int. Cl.³ .................... H04N 5/76; G03B 7/08
[52] U.S. Cl. ................... 358/310; 360/9.1; 354/60 F
[58] Field of Search ............ 338/128.5, 128.6; 360/9, 10, 13, 14, 19; 179/100.16, 100.3 V; 358/213, 41, 228, 95, 230, 93, 185, 280, 127, 219; 354/38, 60 F, 50, 51, 217, 218; 351/24; 340/675; 369/56, 57, 58; 352/172

[56] References Cited

U.S. PATENT DOCUMENTS

| | | | |
|---|---|---|---|
| 3,275,744 | 9/1966 | Dietrich | 358/93 |
| 3,423,524 | 1/1969 | Bradford | 179/100.3 V X |
| 3,561,341 | 2/1971 | Freudenschusz | 354/218 |
| 3,652,154 | 3/1972 | Gebel | 358/228 X |
| 3,678,826 | 7/1972 | Mon et al. | 354/51 |
| 3,715,481 | 2/1973 | Harr | 360/10 X |
| 3,716,658 | 2/1973 | Rackman | 358/230 |
| 3,796,483 | 3/1974 | Sakaguchi et al. | 352/172 |
| 3,925,815 | 12/1975 | Lemelson | 360/14 |
| 3,931,457 | 1/1976 | Mes | 179/100.3 V X |
| 3,931,463 | 1/1976 | Levine | 357/24 X |
| 3,934,161 | 1/1976 | Caywood | 358/213 X |
| 3,934,268 | 1/1976 | Uemura | 360/10 X |
| 3,944,816 | 3/1976 | Harada | 357/24 X |
| 3,999,193 | 12/1976 | Hasegawa | 354/60 F X |
| 4,037,254 | 7/1977 | Monahan | 358/228 |
| 4,057,830 | 11/1977 | Adcock | 358/127 |
| 4,100,607 | 7/1978 | Skinner | 360/14 X |
| 4,114,995 | 9/1978 | Stieringer et al. | 354/218 |
| 4,121,244 | 10/1978 | Nakabe et al. | 358/44 |
| 4,131,919 | 12/1978 | Lloyd et al. | 358/213 X |
| 4,157,575 | 6/1979 | Satoh et al. | 340/675 X |
| 4,174,528 | 11/1979 | White | 358/213 X |

OTHER PUBLICATIONS

Television Broadcasting Tape and Disc Recording Systems: Ennes Sams & Co. Inc. & Bobbs-Merrill Co. Inc. ©1973, p. 331.
Automatic Light Control Electro-Optical CCDTV Systems' Sandhu & LaBubbe: IEEE X'Actions on Aerospace & Electronic Syst., vol. AES-14, No. 1, Jan. 1978, pp. 69-75.
Electronic News Gathering System: NHK Laboratories Note, Serial No. 188, pp. 2-11, Aug. 1975-Ezama et al.

*Primary Examiner*—Stuart N. Hecker
*Attorney, Agent, or Firm*—Toren, McGeady & Stanger

[57] ABSTRACT

An image recording system in which an object image is caused to be formed on a solid state image transducer such as CCD each time a release is actuated, and the image signal stored on said image transducer is recorded as a video signal, thus a single frame image is recorded for each release. By controlling the storing operation of the image signal and the like, the exposure level for the image signal is adjusted to make it possible always to record and reproduce the image with regard to an optimum exposure state.

3 Claims, 41 Drawing Figures

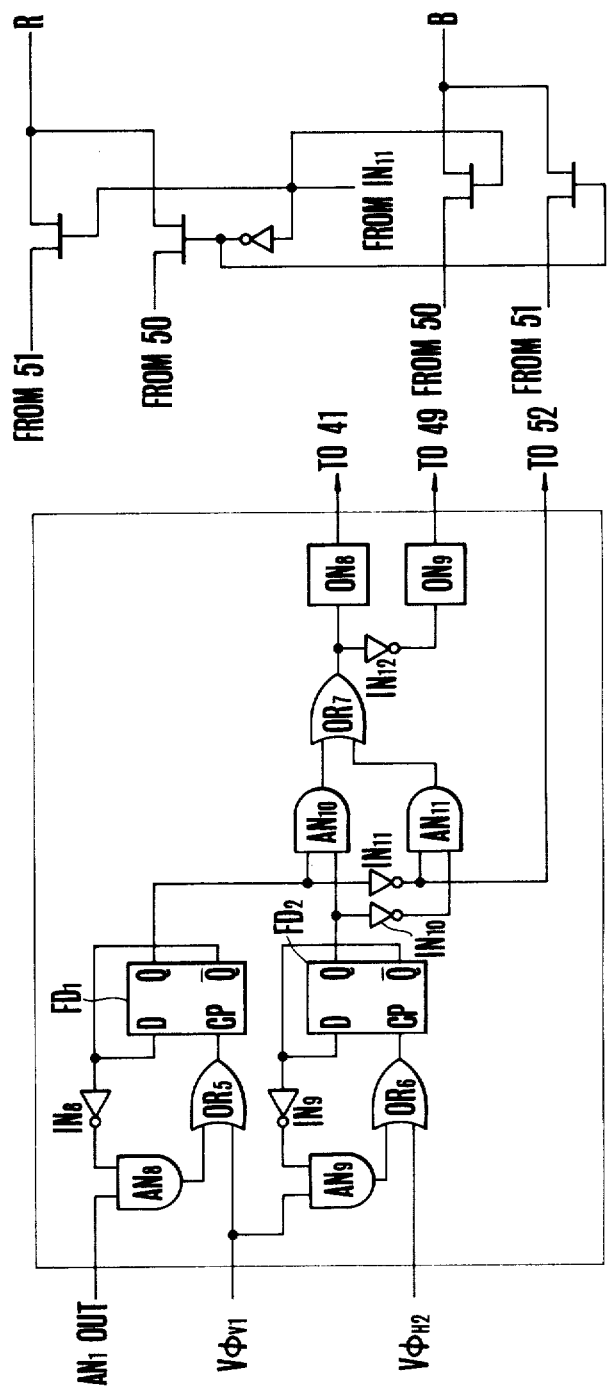

(1) $CP_0$
(2) $CP_1$
(3) FFQ
(4) $IN_{14}$
(5) $R_1C_1$ TIMER
(6) $AN_2$

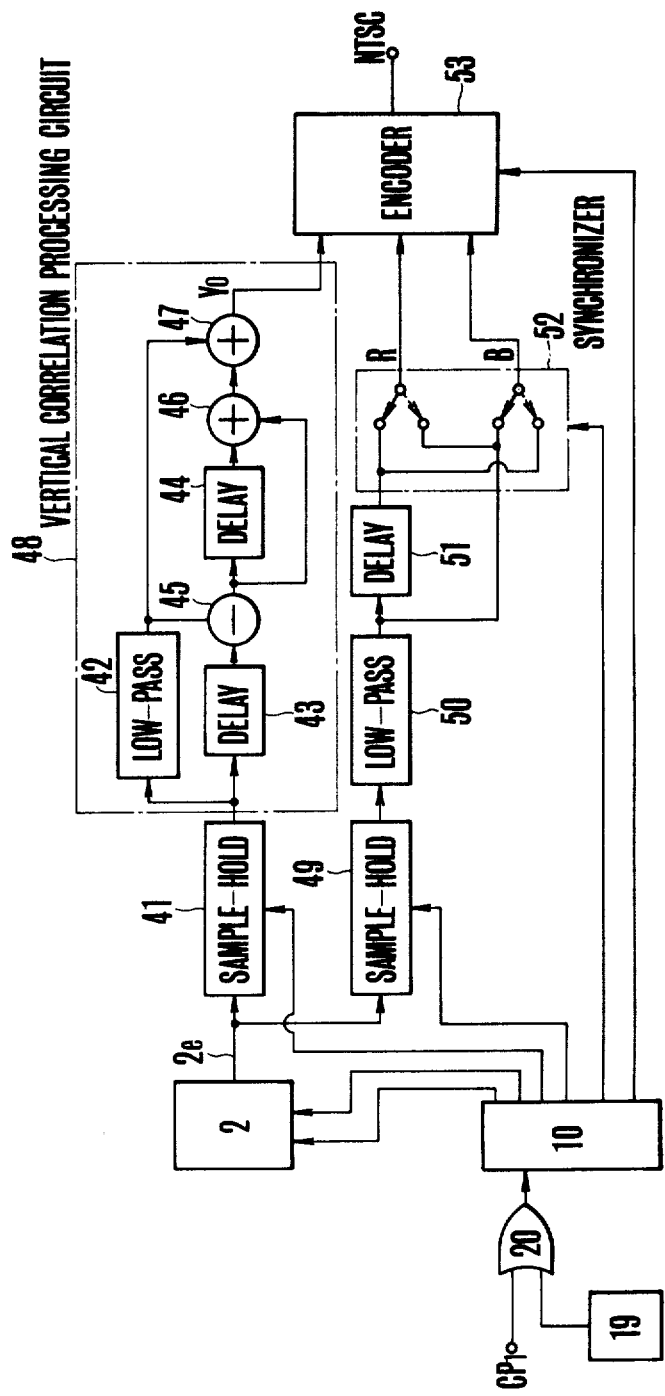
F I G. 4

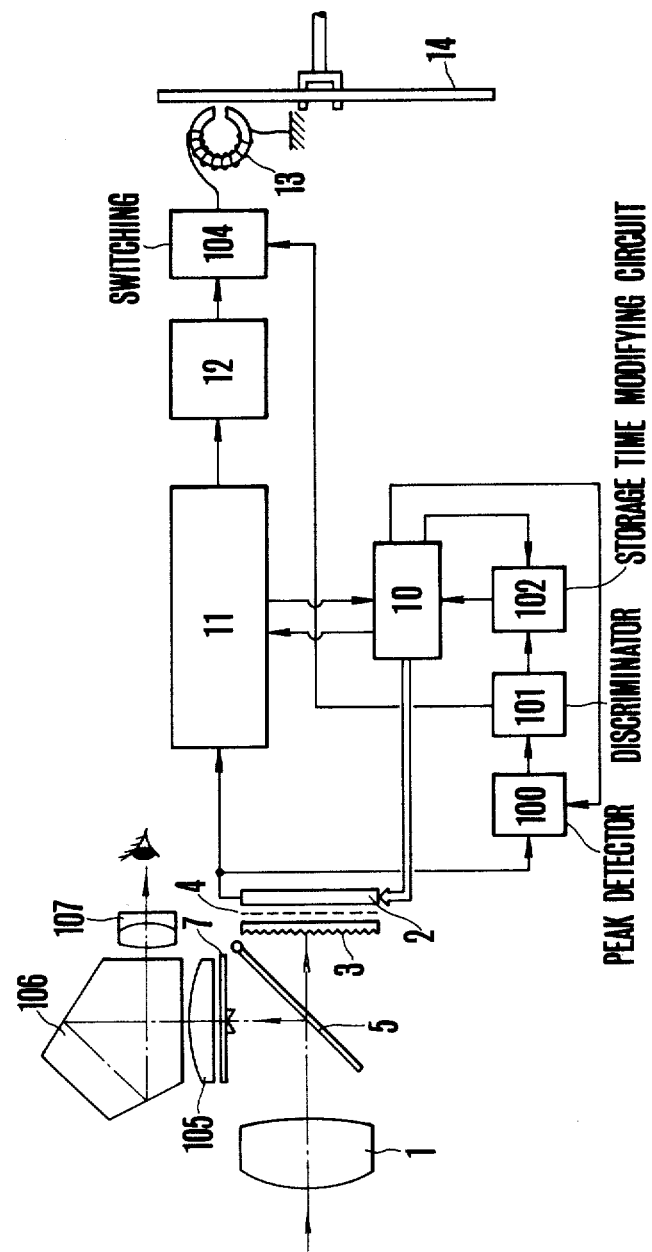

F I G.7(d)
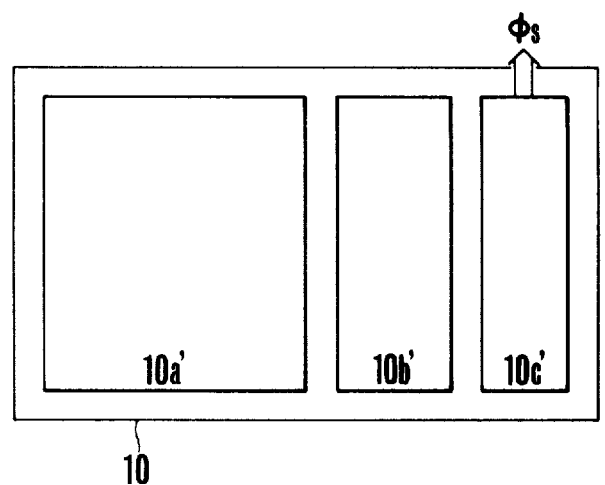

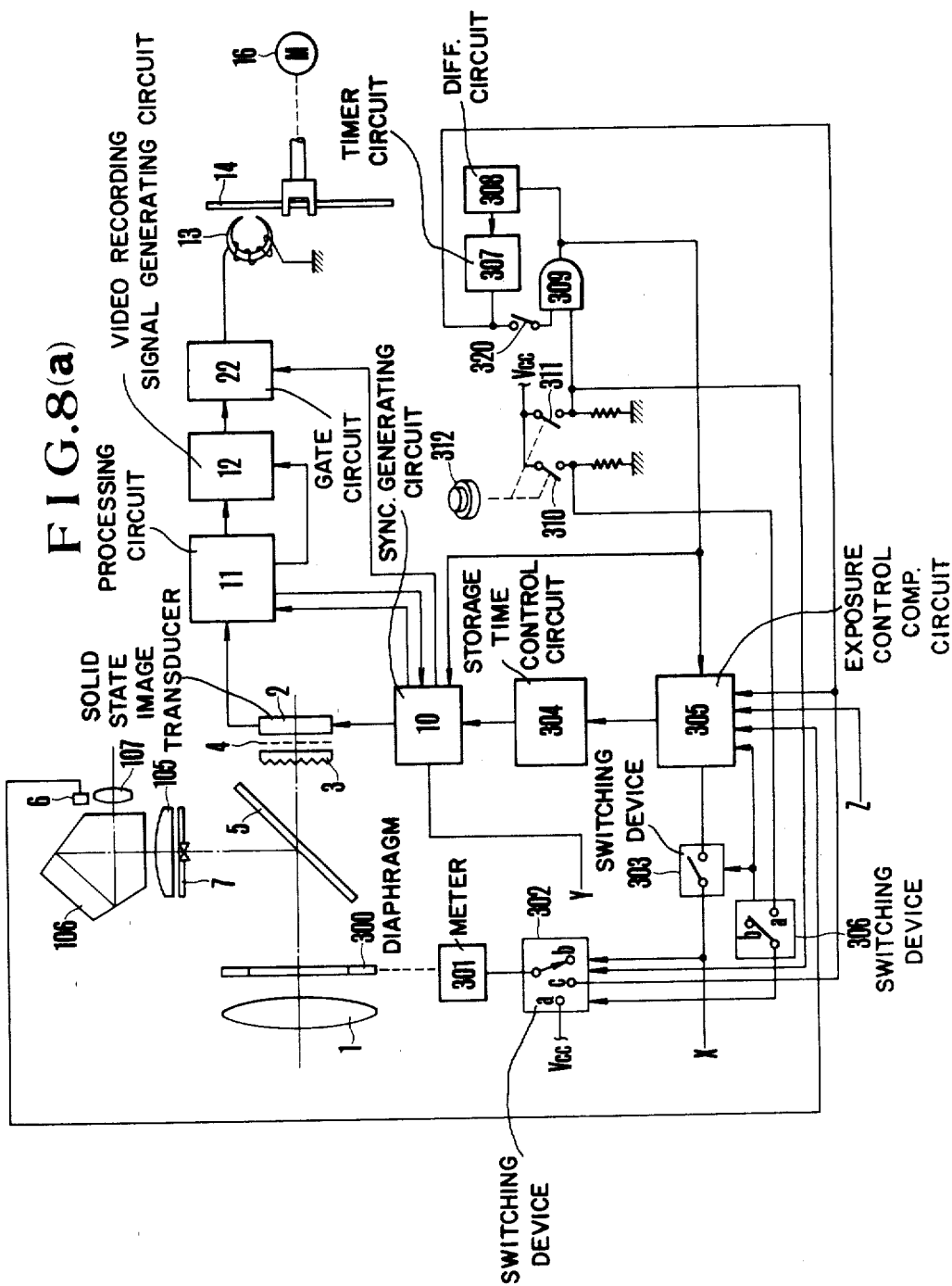

IMAGE RECORDING SYSTEM

BACKGROUND OF THE INVENTION

1. Field of the Invention

This invention relates to an image recording system, and particularly, to a system including a solid state image transducer provided with a large number of independent photoelectric elements independent, image forming optics for forming an image of an object on the image transducer, and a recording medium on which the image signals for the object image obtained from the solid state image transducer are reproducibly accumulated.

2. Description of the Prior Art

The television art, especially color television art employs so-called charge transfer devices, such as CCD and BBD devices, as image sensors, for example, as shown in U.S. Pat. No. 3,982,274. Also known is a method and apparatus for recording and reproducing still pictures by processing the output of such devices so that the image signals, after having been stored, are read out at a relatively slow speed and then converted to video signals which are to be recorded on a magnetic recording medium such as a magnetic disc, as, for example, disclosed in U.S. Pat. No. 4,057,830.

These prior art systems, however, are concerned only with the function of recording the image signals on the magnetic recording medium, and disclose nothing about an exposure level control in producing the image signals. For this reason, the prior art system tends to record some of the image signals in an over-exposed condition, and some in an under-exposed condition, so that a reliable image of optimum tone-reproduction quality cannot be obtained.

For a solid state image transducer, it is desirable to use a charge transfer type device such as CCD and BBD, or X-Y address type device, or a charge injection type device (CID). These devices are fabricated in the form of integrated circuits on a thin silicon semi-conductor substrate. Thus, when the image-receiving surface of the solid state device is accidentally exposed through the image forming optical system to a very intense radiant energy particularly from the sun, there is a great possibility of suddenly heating a portion of the exposed surface of the device to so high a temperature that the solid state device is damaged. Another disadvantage of the prior art systems is that the recorded image is monitored by an optical finder similar to that in the conventional photographic camera.

The prominent advantage of such an electronic image recording system over a photographic camera using conventional photosensitive materials of the silver halide type is, however, the possibility of instant reproduction of recorded image signals by means, for example, of a television set.

SUMMARY OF THE INVENTION

An object of the invention is to improve devices of this type. Another object of the present invention is to provide various schemes for the exposure control with regulation of the image signal level to a proper one in image recording systems of the type described above, and to always obtain an optimum tone-reproduction quality upon later reproduction of the image signals.

Another object of the present invention is, in cases where the optics uses no diaphragm, to provide two schemes, one of which is to control the period of image-dependent charge storing operation of the solid state image transducer in accordance with the object brightness level detected by a photoelectric element separate from those of the image transducer, and another scheme which is to control the storage time as determined by feeding back the signals read out from the solid state image transducer.

Still, another object of the present invention is, in cases where the optics have a variable aperture, not only to adjust the storage time to a proper value, while the diaphragm aperture size is fixed, as can be seen in the so-called diaphragm preselection automatic exposure range for the ordinary camera, or adjust the aperture to a proper value, while a fixed storage time is used, as in the so-called shutter preselection automatic exposure range, but also to provide a number of additional control systems analogous to the programmed exposure control system where the two exposure ranges are hybridized with each other, and to the magic exposure control systems where the preselected value of a primary exposure factor is altered when the computed value of a secondary one exceeds either one of the limits of the dynamic range of exposure control.

In case where an auxiliary artificial light source such as a strobe is used, means are provided for synchronizing the operation of the solid state image transducer with the light source so that the aforesaid auxiliary lighting occurs at the time of initiation of image-dependent charge accumulation, or at the termination of duration of a predetermined delay time.

A further object of the present invention is to provide a playback device which enables the operator to monitor the image during the recording operation, or to reproduce the once recorded image.

Still another object of the present invention is to prevent the solid state image transducer from being damaged by use of a light-shielding means positioned at the front thereof so that when not in use, the light-receiving surface of the transducer is protected from incident light.

These and other objects of the invention will become apparent from the following detailed description of the preferred embodiments when read in conjunction with the accompanying drawings.

BRIEF DESCRIPTION OF THE DRAWINGS

FIG. 1(e) is a circuit diagram illustrating a practical example of construction and arrangement of circuit elements in block 10b of FIG. 1(b).

FIG. 1(g) is a circuit diagram illustrating the details of a synchronizer in block 11 of FIG. 1(a), the synchronizer being indicated by 52 in FIG. 4.

FIG. 4 is a block diagram illustrating the details of the picture signal processing circuit 11 of FIG. 1(a).

FIGS. 7(a) to 7(f) illustrate another embodiment of the present invention with FIG. 7(a) indicating the paths of the various signals. FIG. 7(b) illustrating the details of some of the blocks of FIG. 7(a), and FIG. 7(c) is a pulse timing chart showing the manner in which the operation of the blocks of FIG. 7(b) is controlled.

FIG. 7(d) illustrates the details of the circuit 10' of FIG. 7(a).

FIG. 7(e) is an electrical circuit diagram illustrating the details of the circuit 10a' in FIG. 7(d).

FIG. 7(f) is a circuit diagram illustrating the details of the circuit 10c' of FIG. 7(d).

FIG. 8(a) is a block diagram of still another embodiment of the present invention.

DESCRIPTION OF THE PREFERRED EMBODIMENTS

Figure 1A:
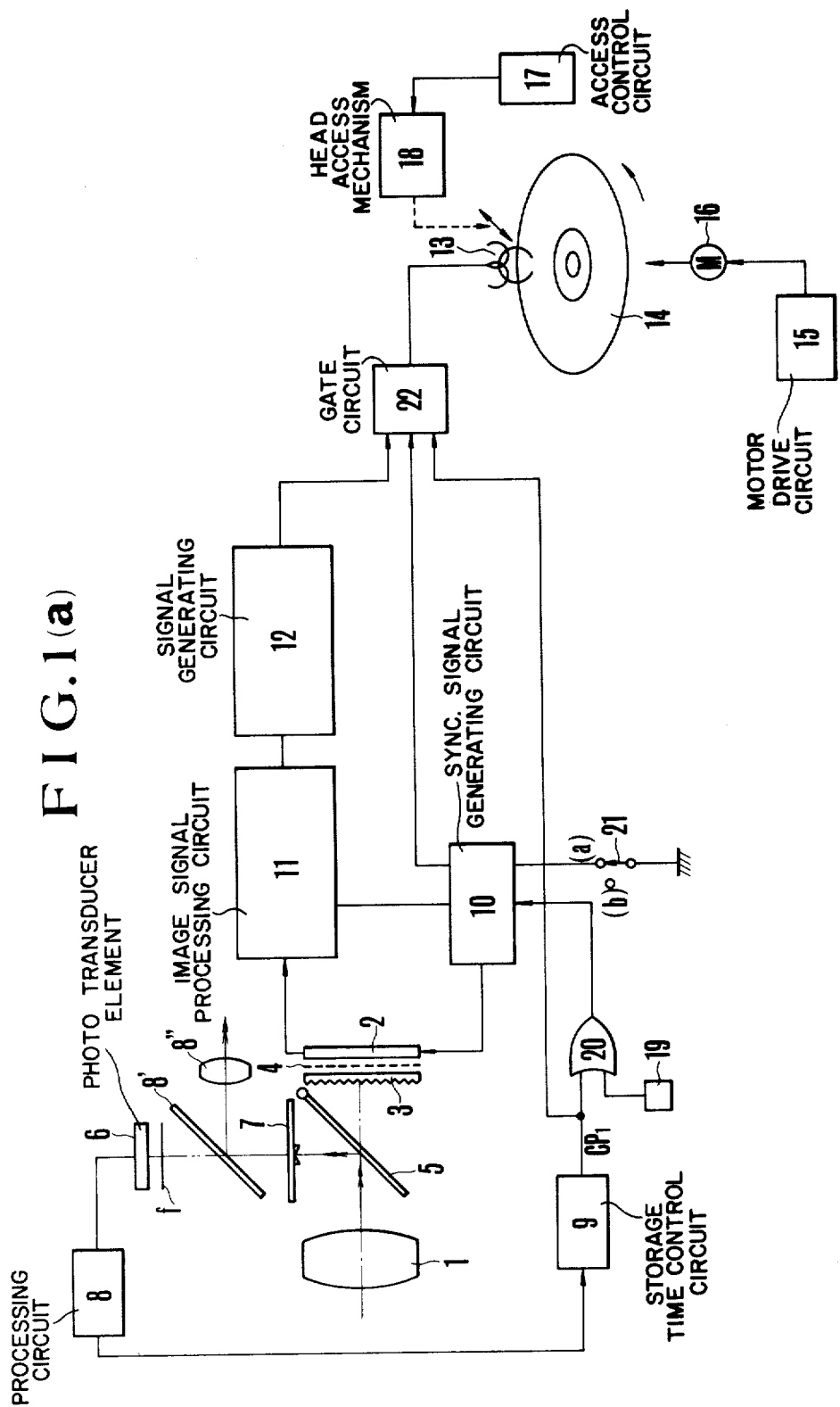
FIG. 1(a) is a schematic view, partly in block form, of one embodiment of an image recording system in accordance with the present invention.

FIGS. 1 to 6, show an embodiment of an image recording system according to the present invention. In FIG. 1(a), optics 1 forming an image of an object (not shown) on a focal plane near an image-receiving surface of a solid state image transducer 2 such as a CCD. Such a CCD transducer is available, from Fairchild Camera & Inst. under the tradename of CCD202. Positioned on the device 2 are a lenticular screen 3 and a color filter 4 arranged in this order from the front to detect color information from the object. A portion of the light emerging from the optics 1 is reflected by a half-mirror 5 to a focusing screen 7 where an image of the object is formed. Light from the image on the screen 7 is radiated upward to a light measuring or photoelectric element 6 such as silicon photo-cell through a beam splitter 8' and a luminosity factor correction filter, f. Some of the light from the image enters an eye-piece 8".

Figure 2A:
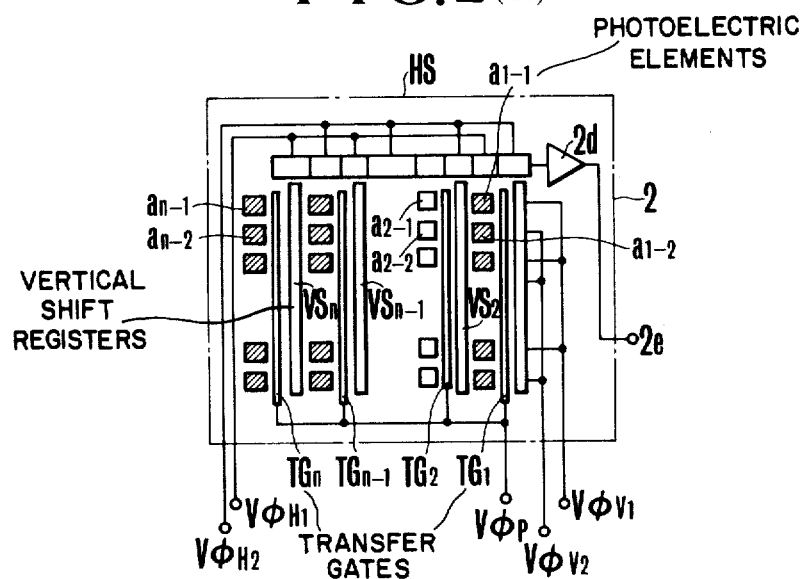
FIG. 2(a) is a schematic view of the structure of a solid state image sensing device in FIG. 1(a).
Figure 2B:
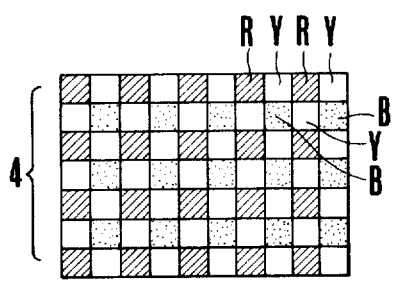
FIG. 2(b) is a plan view of the structure of a color filter in FIG. 1(a).

As shown in FIGS. 2(a) and 2(b), the image transducer 2 is comprises a great number of photoelectric elements, $a_{1.1}, a_{2.1}, \ldots, a_{mn}$, in minute segment form. Also present are transfer gates TG1, TG2, . . . , TGn which are responsive to a control pulse $V_{\phi P}$ for transferring the charges stored on the individual photoelectric elements as an image signal to vertical shift registers VS1, VS2, . . . , VSn. A horizontal shift register HS transfers the image signal from the vertical shift registers VSs (s=1, 2 . . . n,) through a buffer amplifier 2d to an outlet or output terminal 2e. After the one-frame image signal is stored, it is transferred to vertical shift registers by a pulse $V_{\phi P}$ and the contents of the vertical shift registers VSs are transferred upward line by line in response to a series of control pulses $V_{\phi V1}, V_{\phi V2}$. During the time interval between the two successive vertical transfer control pulses, the horizontal shift register HS responsive to a series of control pulses $V_{\phi H1}, V_{\phi H2}$ transfers the contents of the horizontal shift registers HSs in each line row by row to the right as viewed in the figure. As a result, the one-frame image signal is formed by reading out the outputs of the individual photoelectric elements in order. As the operative aspect of the aforesaid CCD is well known to those skilled in the art, no more explanation is given.

In FIG. 2(b), the color filter 4 is divided into sections equal in area to each other and corresponding in number to that of the photoelectric elements, a's. Those sections designated by the character Y are minute color filters having a transmission characteristic selected so as to obtain the spectral component Y for the brightness and color signal in the typical television standard. The other sections designated by characters R and B are minute color filters having transmission characteristics selected so as to obtain the spectral components R (red) and B (blue) in the same television standard. Of these, the sections Y and R are arranged one after another, namely, Y-R-Y-R-. . . in each odd-numbered line. In the even-numbered line, the arrangement is B-Y-B-Y- . . . Therefore, the first line of photosensitive elements $a_{1.1}$, $a_{2.1}$, . . . produces a Y-R-Y-R- . . . series of signals, and the second line of light-receiving elements $a_{1.2}, a_{2.2}, a_{3.2}$, . . . produces a B-Y-B-Y- . . . series of signals, etc.

Figure 3:
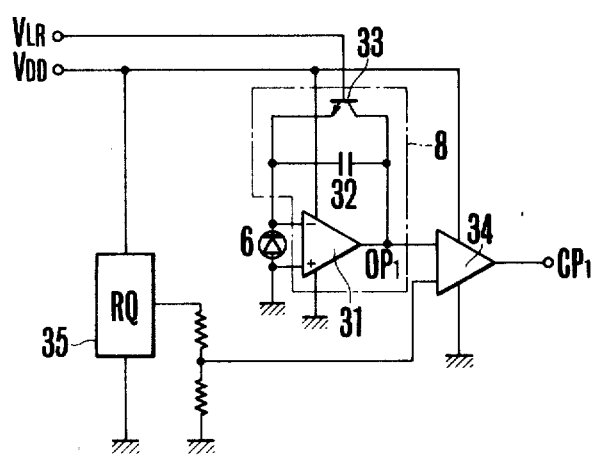
FIG. 3 is a circuit diagram illustrating a practical example of a light value signal processing and storage time control circuit usable in the circuit of FIG. 1(a).

Turning to FIG. 1(a) again, the output of the photoelectric transducer element 6 is applied to a light value signal processing circuit 8. Circuit 8 then produces an output signal for setting a storage time for the solid state image sensing device 2 through a storage time control circuit 9. This storage time control circuit 9 produces a timing pulse CP1 adjusting the period of light accumulation of the solid state image sensing device 2 to a proper value dependent upon the light value. The timing pulse CP1 is applied to a synchronizing signal generating circuit 10. The light value signal processing circuit 8 and storage time control circuit 9 are constructed, for example, as shown in FIG. 3, from an operational amplifier 31 having two inputs, between which the photoelectric element 6 is connected. A condenser 32 is connected between one of the inputs and an output of the operational amplifier 31 to integrate incident light on the photoelectric element 6. The output voltage OP1 of the operational amplifier 31 proportional to the amount of integrated light, is compared with a reference voltage from a constant voltage source 35 by a comparator circuit 34 upon coincidence therebetween to produce the aforesaid timing pulse CP1. The collector-emitter path of a transistor 33 is connected across the condenser 32 and establishes a capacitor path for the capacitor when a control pulse $V_{LR}$ is given to the base of the transistor 33. The synchronizing signal generating circuit 10 in response to the timing pulse CP1, produces a pulse $V_{\phi P}$ for the aforementioned transfer gates, and for the horizontal and vertical transfer pulses $V_{\phi V1}$, $V_{\phi V2}$, $V_{\phi H1}$ and $V_{\phi H2}$. Circuit 10 also generates a reset pulse $V_{\phi RS}$ which resets the image signals which are successively read out each time the image signal corresponding to each of the photoelectric elements is read out, thereby preventing the image signals corresponding to the individual photoelectric elements from influencing each other. Further, circuit 10 generates pulse $V_{LR}$ which controls the opening of the transistor 33 to discharge the condenser 32. In addition, the synchronizing signal generating circuit 10 governs the timing control of the whole system.

Figure 10:
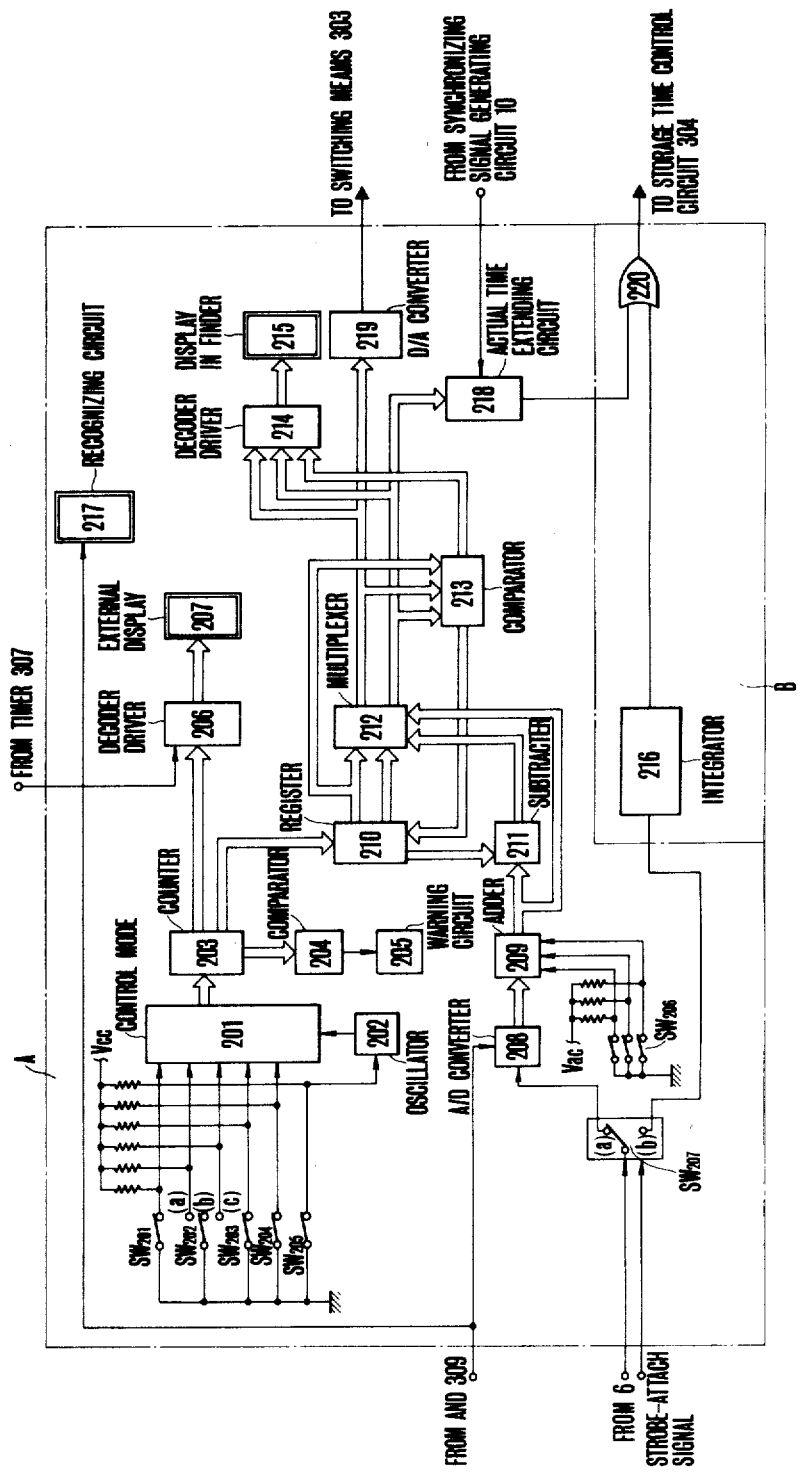
FIG. 10 is a block diagram of another example of the exposure value computation control circuit 305 of FIG. 8(a).

An image signal processing circuit 11 is receptive to the image signals read out from the solid state image transducer 2 for conversion to NTSC signals. The construction of that circuit is shown in FIG. 4. In FIG. 4, 2 and 10 represent the same members. Application of a storage time control signal to the synchronizing signal generating circuit 10 is indicated by arrow CP1. The signals read out from the solid state image transducer 2 are produced through an outlet 2e. Of these, the brightness signals Y are subject to vertical correlation processing. For this purpose, the signals corresponding to the sections Y in the color filter 4 are read out through a sample holding circuit 41 and then applied to a vertical correlation processing circuit 48. Circuit 48 is of known construction in the art, and is composed of a low pass filter 42, a delay circuit 43, another delay circuit 44 for performing a delay equal to one horizontal scanning line (1H), a subtractor 45, and adders 46 and 47. The vertical correlation processing circuit 48 produces output signals of brightness Yo. On the other hand, the red color component R and the blue color component B are obtained for each 1H. Therefore, in order to continuously obtain color image signals, another sample holding circuit 49 is provided to receive signals corresponding to the sections R and B in the color filter 4. Outputs representative of the R component and B component are then applied to a synchronizing circuit 52 of known construction in the art through a low pass filter for removal of unnecessary high frequency components and through a delay circuit 51. The synchronizing circuit 52 has two output terminals, at which the R signal always appears, and the other at which the B signal always appears. The separated brightness component Yo, red color component R and blue color component B are all applied to an encoder 52 having an output which is a so-called NTSC signal. This signal is thus the output of the image signal processing circuit 11.

Figure 5:
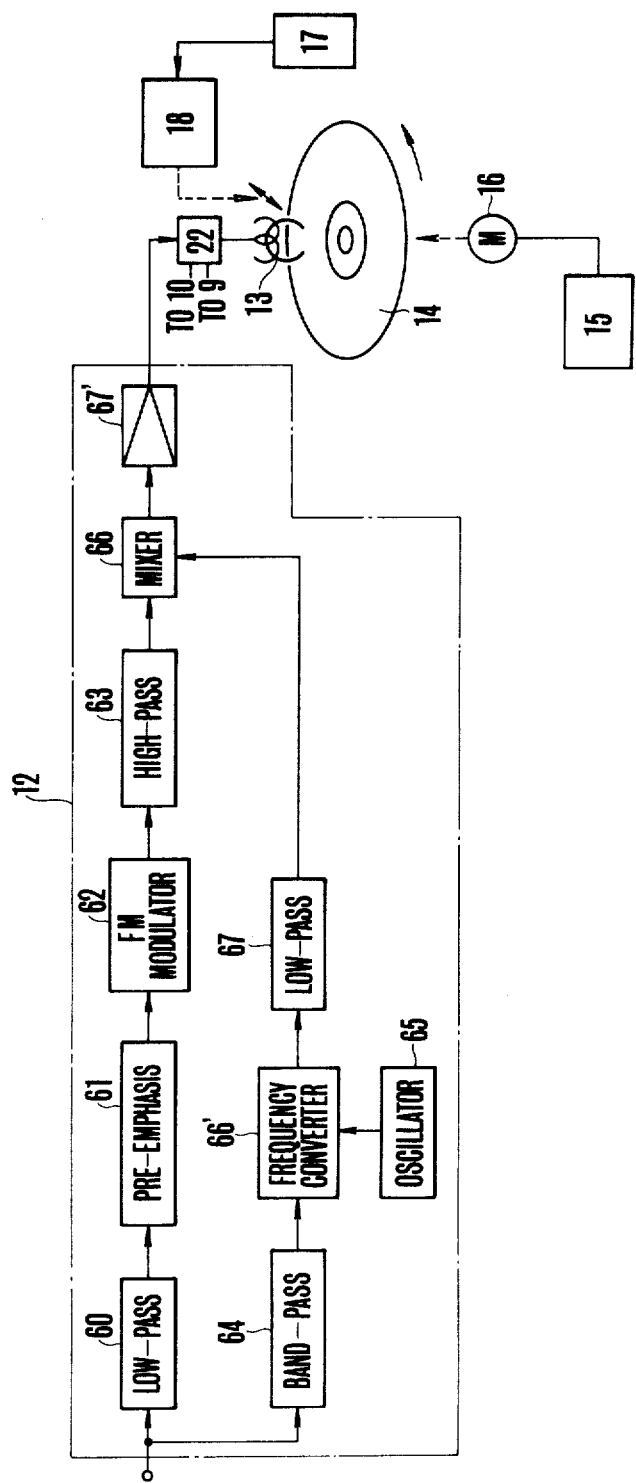
FIG. 5 illustrates the details of video signal forming circuit 12 of FIG. 1(a).

Turning to FIG. 1(a), this NTSC signal is applied to a video recording signal generating circuit 12 where it is converted to a video signal to be recorded on an image recording medium 14 such as a video disc by means of a magnetic head 13. In this embodiment, the image recording medium 14 takes the form of a video disc rotated by an electric motor M at a speed controlled by a motor drive circuit 15 through a drive shaft (not shown). A single frame image signal is thus recorded on a special track on the magnetic disc, as about forty tracks are provided concentrically. To record another single frame image signal, therefore, the magnetic head 13 must be displaced radially. For this purpose, there is provided a head access mechanism 18 whose operation is controlled by a circuit 17. The aforementioned video recording signal generating circuit 12 is of a known type that converts the NTSC signal to a video signal, and an example of it is shown in FIG. 5. The same reference numerals have been used to denote the similar parts as in FIG. 1 and therefore their explanation is omitted. In the FIGS., 60, 61, 62 and 63 are respectively a low pass filter, pre-emphasis circuit, FM modulation circuit, and a high pass filter. By these, the brightness signal Y is processed. The chrominance information is recovered from a color subcarrier signal of 3.58 MHz through a band pass filter 64. The output of the band pass filter 64 is demodulated by the frequency produced from an oscillator 65 and balanced by a frequency converter 66' and is then processed as a color signal through a low pass filter 67. The resultant brightness signal and color signal are mixed by a mixer 66 to produce an output signal which, after having been amplified by a record amplifier 67' is fed to the magnetic head 13 for image recording.

In to FIG. 1(a), a one-shot circuit 19 is responsive to the depression of a release button (not shown) for producing a release pulse CPo. The output of the one-shot circuit 19 is connected through an OR gate 20 to the aforementioned synchronizing signal generating circuit 10. Thus, the circuit 10 is rendered operative in response to the release pulse CPo. With its input connected to the output of the video recording signal generating circuit 12, a gate circuit 22 transmits the video signal to the head 13, while its gating control inputs are connected to the respective outputs of the aforementioned storage time control circuit 9 and synchronizing signal generating circuit 10. The video signal is thus applied to the head 13 in response to the pulse CP1 produced from the control circuit 9. Further, a mode switch 21 selectively switches between continuous exposure and one-frame exposure modes. Upon connection to a contact (a), the continuous exposure mode is selected, and upon connection to a contact (b), the one-frame exposure mode is selected.

Figure 1B:
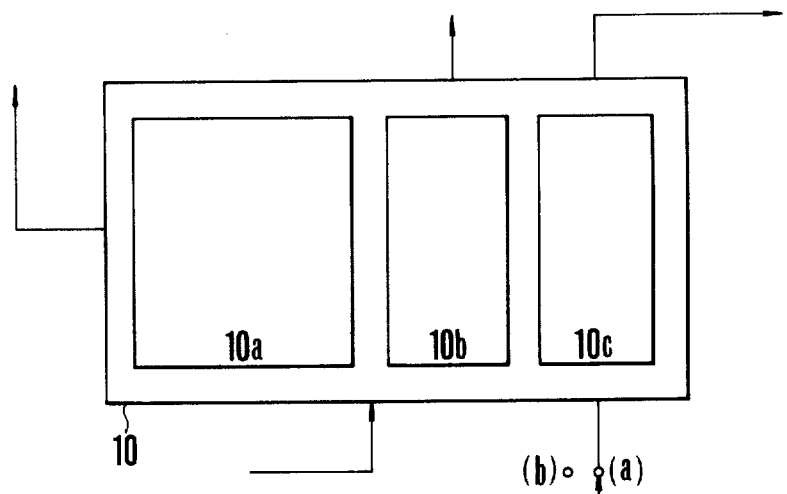
FIG. 1(b) is a block diagram illustrating the details of circuit 10 of FIG. 1(a).
Figure 1D:
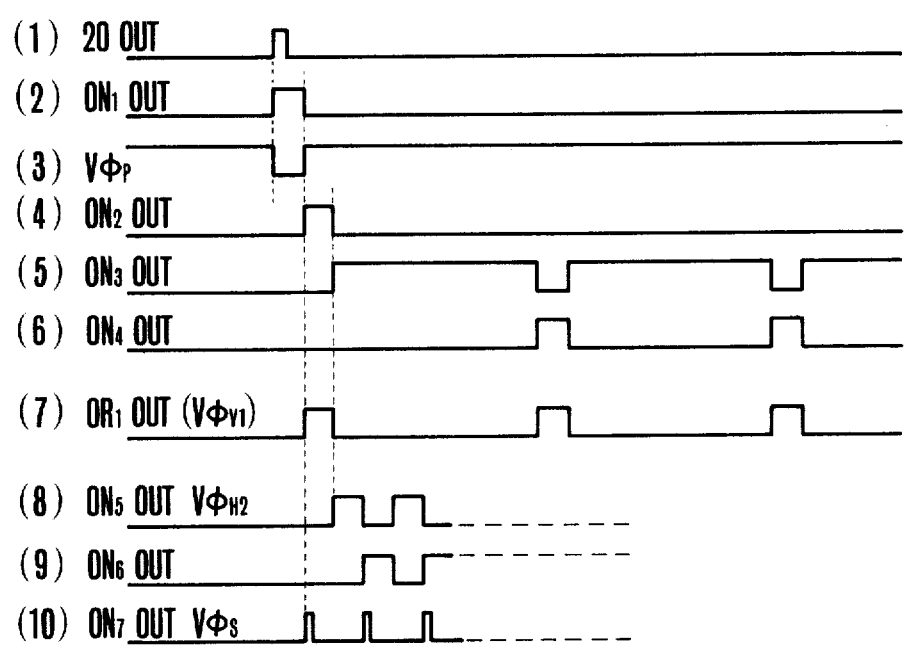
FIG. 1(d) is a pulse timing chart illustrating the manner in which the circuit of FIG. 1(c) operates.
Figure 1C:
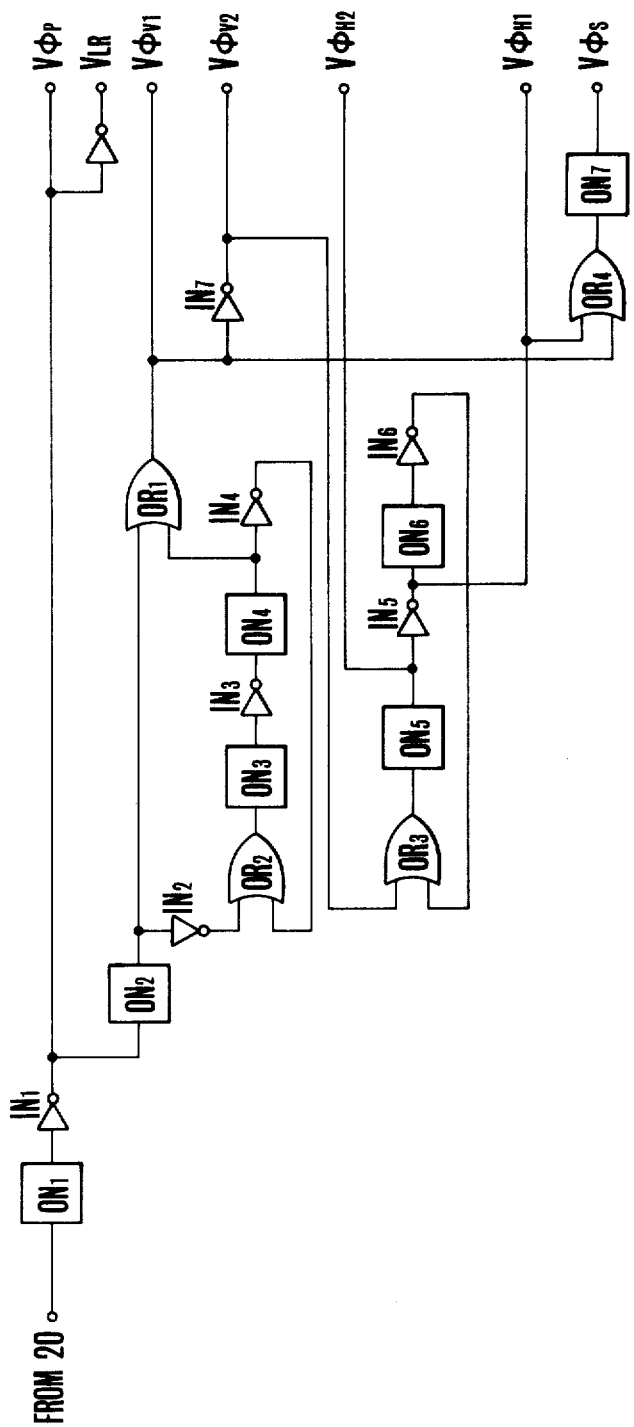
FIG. 1(c) is an electrical circuit diagram illustrating a practical example of construction and arrangement of circuit elements in block 10a of FIG. 1(b).

FIG. 1(b) shows a practical example of the synchronizing signal generating circuit 10 shown in FIG. 1(a), including a drive circuit for the solid state image transducer 2 which is indicated by numeral 10a. This drive circuit 10a may be of a known type sold from Fairchild Camera & Inst., for example, and can be adapted for use with the transduces CCD202. As shown in FIG. 1(c), the drive circuit 10a is constructed from one-shot circuits ON1 to ON7, inverters IN1 to IN7, and OR gates OR1 to OR4. Upon generation of the pulse from the OR gate 20 of FIG. 1(a) on the input of the one-shot circuit ON1, the various circuit elements operate in a manner shown in FIG. 1(d) to produce pulses $V_{\phi P}$, $V_{\phi V1}$, $V_{\phi V2}$, $V_{\phi H1}$, $V_{\phi H2}$ and $V_{\phi RS}$. It is noted here that each one-shot circuit is actuated in synchronism with the leading edge of the pulse.

Figure 1F:
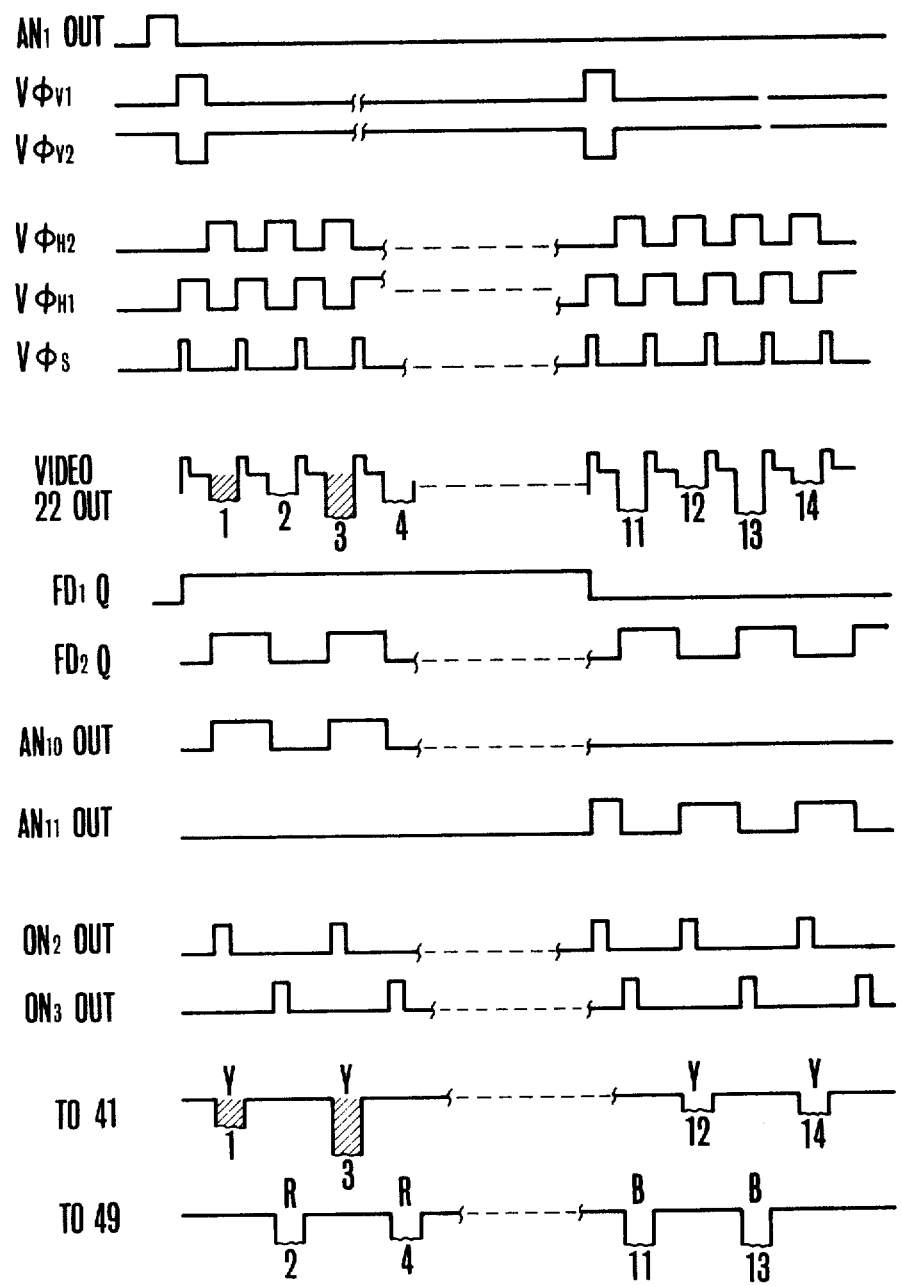
FIG. 1(f) is a pulse timing chart illustrating a manner in which the circuit of FIG. 1(e) operates.

Turning to FIG. 1(b), a signal transmitting circuit 10b is constructed as shown in FIG. 1(e). The circuit comprises D-type flip-flops FD1 and FD2, AND gates AN8 to AN11, inverters IN8-IN12, OR gates OR5 to OR7 and one-shot circuits ON8 and ON9. In this circuit, one of two inputs of the AND gate AN8 is connected to the output of an AND gate AN1 to be described, and the pulse $V_{\phi V1}$ is applied to one input of the OR gate OR5 and AND gate AN9. Further, the pulse $V_{\phi H2}$ is applied to one input of the OR gate OR6. The flip-flops and one-shot circuits in this circuit also synchronize with the leading edge of the pulse. The circuit represented in FIG. 1(e) operates as shown in the waveforms of FIG. 1(f). The one-shot circuits ON8 and ON9 alternately produce pulses in synchronism with the pulse $V_{\phi H2}$, and the pulses are transmitted to the sample holding circuits 41 and 49 of FIG. 4. The sample holding circuit 41 of FIG. 4 receives the signals from only those of the photoelectric elements of the solid state image transducer 2 which correspond to the Y sections of the color filter 4. Meanwhile, the other sample holding circuit 49 receives the signals from those photoelectric elements corresponding to the R sections of the color filter 4 when the flip-flop FD1 produces a high level signal, and from elements corresponding to the B sections when the flip-flop FD1 produces a low level signal. The output of the inverter IN11 is connected to the synchronizing circuit 52 of FIG. 4, so that when the output of IN11 is a high, or when the output of the flip-flop FD1 is a low, the synchronizing circuit 52 switches to a position indicated by a solid line illustrated in FIG. 4. Conversely when the output of the inverter IN11 is high, the synchronizing circuit 52 is switched to the dashed line position. Consequently, an R component signal is always produced from the output terminal R of the synchronizing circuit 52, and from the output terminal B B component signal is always produced from the output terminal B. A practical example of such a synchronizing circuit 52 is shown in FIG. 1(g) and comprises analogue switches and inverters.

Figure 1H:
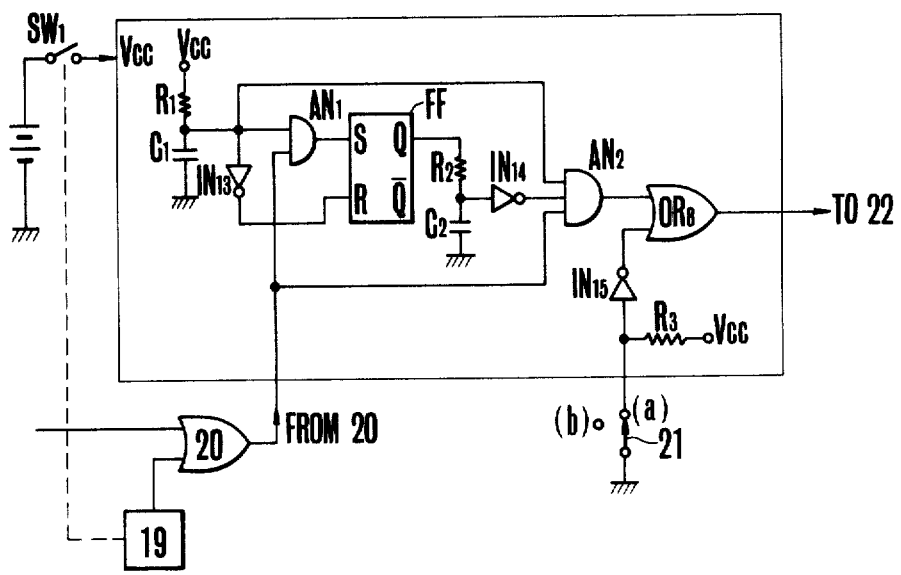
FIG. 1(h) is a circuit diagram illustrating the detail of block 10c of FIG. 1(b).
Figure 1I:
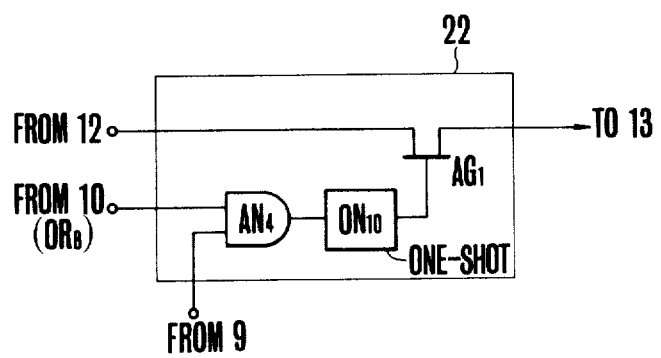
FIG. 1(i) is a circuit diagram illustrating the detail of the circuit 22 of FIG. 1(a).

Turning to FIG. 1(b), numeral 10c represents a signal transmitting circuit which transmits a signal to the gate circuit of FIG. 1(a). This circuit is constructed as shown in FIG. 1(h), and comprises a switch SW1 arranged to close when the release button is depressed, and a timing circuit of a resistor R1 and condenser C1 across which a voltage Vcc is applied when the switch SW1 is closed, inverters IN13, IN14 and IN15, AND gates AN1 and AN2, an OR gate OR8, a flip-flop FF, and a time constant circuit of a resistor R2 and condenser C2 is connected to the output Q of the flip-flop FF. When in the continuous exposure mode, since the switch 21 is connected with the contact (a), the inverter IN15 produces a high level output which is then transmitted through the OR gate OR8 to the gate circuit 22. On the other hand, when in the single frame exposure mode, the connection of the switch 21 to the contact (b) causes the inverter IN15 to produce an output of a low level, so that the high level signal from the inverter IN15 is inhibited from being transmitted. Instead only one pulse CP1 from the storage time control circuit 9 is allowed to be transmitted through the OR gate OR8 to the gate circuit 22. And, the gate circuit 22 of FIG. 1(a) is constructed, for example, as shown in FIG. 1(i). In FIG. 1(i), numeral AN4 represents an AND gate having one input connected to the OR gate OR8 of FIG. 1(h), and another input connected to the storage time control circuit. Numeral ON10 represents a one-shot circuit, and AG1 is an analoggate having an input connected to the video recording signal generating circuit 12 of FIG. 1(a) and an output connected to the head 13.

Figure 6:
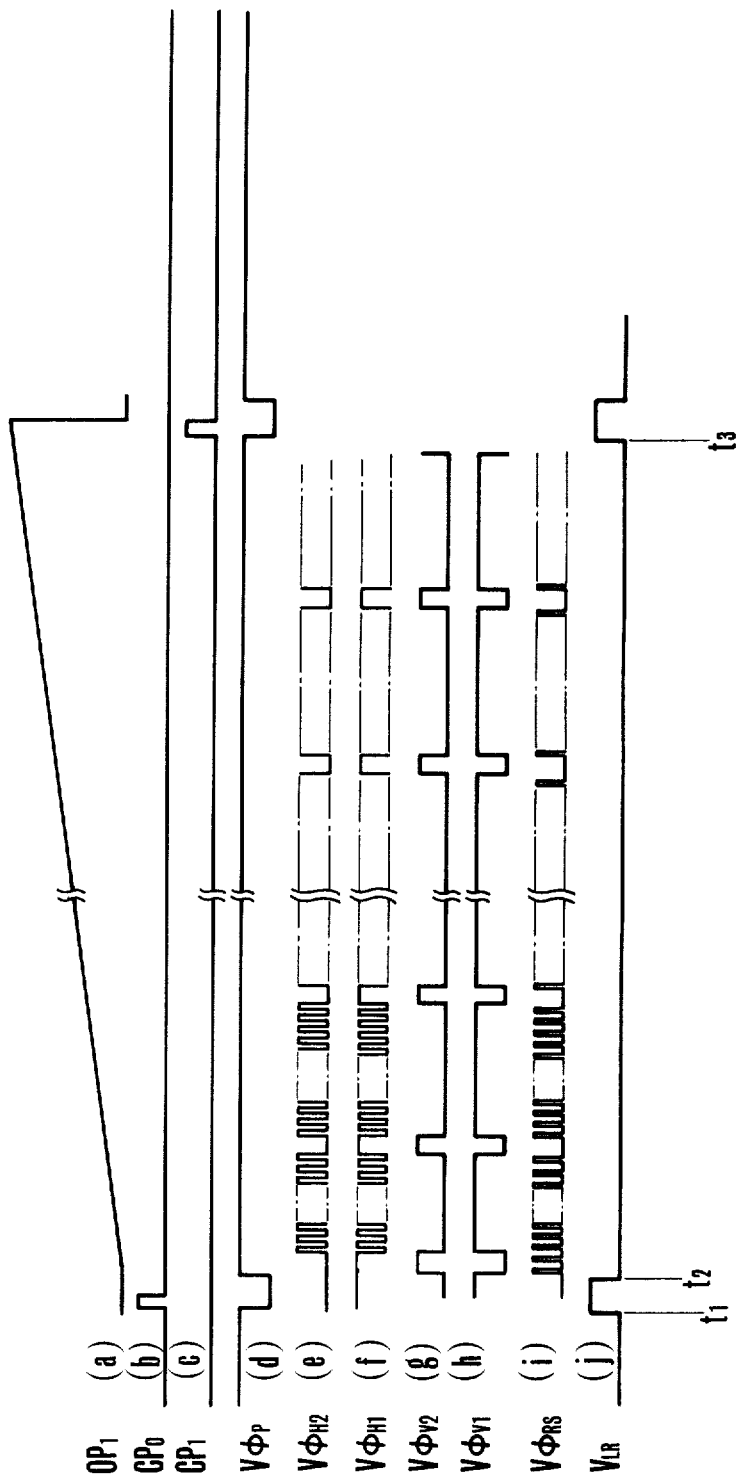
FIGS. 6a–j, shows the waveforms produced by the circuits of FIG. 1 to FIG. 5 to control the operation of the image sensing device of FIG. 1(a).

The operation of the first embodiment of the invention shown in FIGS. 1 to 5 will be described with reference to the waveforms of FIG. 6. Discussion is first directed to the continuous exposure mode when the switch 21 is connected to the contact (a). Let us now assume that an electrical power switch (not shown) is ON, and the various circuit portions are supplied with electrical power. Then a motor drive circuit 15 is under operation, causing a motor 16 to rotate at a predetermined constant speed. However, at this time, the signal CP1 has not been produced as yet and will be described, and therefore the gate circuit 22 remains closed to de-energize the head 13. Thus, the recording medium 14 does not record any image signal.

When the release button (not shown) is depressed, the one-shot circuit 19 is actuated for operation by a switch cooperative with the release button to produce an output pulse CPo of very short width as shown in FIG. 6(b) at time $t_1$. This pulse CPo is directed through the OR gate 20 to the synchronizing signal generating circuit 10. Responsive to this pulse, the generating circuit 10 starts to operate with production of a number of signals, one of which controls the read out operation of the charge, that is, an image signal stored on the solid state image transducer 2 as mentioned, and others which control the operation of the image processing circuit 11 and video recording signal generating circuit 12. In FIGS. 1(c) and 1(d), when the pulse CPo is applied through the OR gate 20 to the synchronizing signal generating circuit 10, a one-shot circuit ON1 of FIG. 1(c) produces a pulse in synchronism with the leading edge of the pulse of the OR gate 20 as shown in FIG. 1(d) at (2). Said pulse after having passed through an inverter IN1 serves as the pulse $V_{\phi P}$ shown in FIG. 1(d) at (3). Also in synchronism with the pulse $V_{\phi P}$, a one-shot circuit ON2 is actuated to produce a pulse as shown at (4) in FIG. 1(d). Said pulse is inverted by an inverter IN2, and applied through an OR gate OR2 to a one-shot circuit ON3. The one-shot circuit ON3 is thus triggered by a pulse applied to it through the OR gate OR2, as shown at (5) in FIG. 1(d), to produce an output pulse. The pulse from the one-shot circuit ON3 is applied through an inverter IN3 to a one-shot circuit ON4. Hence, the one-shot circuit ON4 is triggered as shown at (6) in FIG. 1(d) to produce a timing pulse shown at (4) in FIG. 1(d), which is then applied through an inverter IN4 and OR gate OR2 to the one-shot circuit ON3.

Such procedure repeats itself with the result that the one-shot circuit ON4 produces a train of pulses as shown at (6) in FIG. 1(d). Again said one-shot circuit ON4 gives its output also to an OR gate OR1, producing a train of pulses $V_{\phi V1}$ at a frequency. This pulse train $V_{\phi V1}$ after having passed through an inverter IN7 serves as a pulse train $V_{\phi V2}$. This pulse train $V_{\phi V2}$ is applied through an OR gate OR3 to a one-shot circuit ON5 which produces a pulse $V_{\phi H2}$ in synchronism with said pulse $V_{\phi V2}$. Said pulse $V_{\phi H2}$ is applied through an inverter IN5 to a one-shot circuit ON6, whose output is applied through an inverter IN6 and OR gate OR3 to the one-shot circuit ON5. Thus, said pulse $V_{\phi H2}$ is produced repeatedly as shown at (8) in FIG. 1(d). And, the pulse $V_{\phi H1}$ which is produced through the inverter IN5 is also repeatedly produced.

Since the input of the OR gate OR4 is connected to the inverter IN5 and OR gate OR1, and the one-shot circuit ON7 is triggered in synchronism with the pulses $V_{\phi V1}$ and $V_{\phi H1}$, the pulse $V_{\phi RS}$ is repeatedly produced as shown at (10) in FIG. 1(d). Therefore, as shown in FIG. 6 at (d) to (i), the individual pulses $V_{\phi P}$, $V_{\phi V1}$, $V_{\phi V2}$, $V_{\phi H1}$, $V_{\phi H2}$ and $V_{\phi RS}$ are produced, and the solid state image transducer 2 is driven by said pulses to perform a readout operation of the image signals. In other words, when the individual pulses are produced in such a manner, as the pulse $V_{LR}$, produced by inverting the pulse $V_{\phi P}$ in synchronism with the transfer pulse $V_{\phi P}$, is fed to a transistor 33 of FIG. 3, the transistor is rendered conductive for a very short time to discharge the charge stored on the condenser 32. Thus, the condenser 32 is set to an initial state. Further, the transfer pulse $V_{\phi P}$ is fed to the transfer gates TG1-TGn of FIG. 2(a), and the charges on the individual photosensitive elements are transferred to the vertical shift registers at time $t_2$ (FIG. 6). Thus, the image signal is recorded on the solid state image transducer 2 before the release is memorized. For this reason, the solid state image transducer is reset to the initial state and starts storing a new image signal at time $t_2$. On the other hand, when the charges stored on the photosensitive elements before the release, are transferred to the vertical shift registers, the above described signals $V_{\phi H1}$, $V_{\phi H2}$, $V_{\phi V1}$, $V_{\phi V2}$ and $V_{\phi LR}$ from the synchronizing signal generating circuit 10 cause a time sequence of image signals to be produced from the output terminal 2e. The image signals are then fed to the image signal processing circuit 11 and video recording signal generating circuit 12 where they are converted to video signals. The video signals are fed to the head 13. Thus, the video signals corresponding to the image signals are recorded on the image recording medium 14. As mentioned, however, the storage time control circuit 9 has not produced the signal CP1 as yet. Therefore, the gate circuit 22 remains OFF, inhibiting the transmission of the video signals and energization of the head 13. Thus, recording of the video signals on the image recording medium 14 is not performed. On the other hand, as mentioned, at time point $t_2$, the condenser 32 of FIG. 3 is reset to the initial state, and the transistor 33 is simultaneously turned off. Accordingly, charging of the condenser 32 is initiated from the time $t_2$. The speed of charging of the condenser 32 depends upon the time constant determined by the impedance of the photoelectric element 6. Since this impedance corresponds to the level of brightness of the object, the output voltage ramp of the operational amplifier 31 has a slope corresponding to the object brightness level shown in FIG. 6(a). When said voltage reaches the reference voltage from the constant voltage source 35 at time point $t_3$, the comparator circuit 34 is inverted to produce an output signal CP1 as shown in FIG. 6(c). This output signal CP1 is fed through the OR gate 20 of FIG. 1(a) to the one-shot circuit ON1 of FIG. 1(c). Therefore, as mentioned, $V_{\phi P}$ is produced again and fed to the transfer gates TG1 to TGn of FIG. 2(a). Thus, the charges as the image signal stored on the solid state transducer 2 between the time $t_2$ just after the release and at time point $t_3$ are transferred to the vertical shift registers. Thus, the charge storing operation of the solid state image transducer for the one-frame picture is completed. In other words, the storage time of the image signal on the solid state image transducer for a single frame exposure, that is, the exposure time, is controlled in accordance with the object brightness level by the light value signal processing circuit 8 and storage time control circuit 9. In other words, the storage time of the image signal for the object image on the solid state image transducer is varied with the object brightness. The brighter the object, the lower the above described impedance and the faster the condenser 32 is charged, the faster the timing of inversion of the comparator circuit. As a result, a shorter storage time is obtained. Conversely when the object is dark, the above described impedance is high, and the condenser 32 is charged at a slow rate. The timing of inversion of the comparator circuit is delayed with the result that a longer storage time is set. Thus, the image signal from the solid state image transducer 2 is maintained at a proper exposure level, and is prevented from being saturated or being too faint to be recorded.

Such an operation is followed by the production of the output signal CP1 from the comparator circuit when the correct exposure is reached, and said signal transfers the image signal of the correctly controlled exposure level to the vertical shift registers to be memorized. Also, the output signal CP1 produced at the time $t_3$ (FIG. 6) at which the memorizing operation of the image signal has been completed, is fed to the gate circuit 22 of FIG. 1(a). Thus the gate circuit 22 is turned to an open state time point $t_3$ at which the image signal is memorized in the proper exposure level. Because of the continuous exposure mode, the switch 21 of FIG. 1(h) is connected to the contact (a), and the OR gate OR8 produces the high level signal. Therefore, the AND gate AN4 of FIG. 1(i) responsive to the output signal CP1 from the circuit 9 triggers the one-shot circuit ON10. The one-shot circuit ON10 produces a high level signal for a predetermined time interval necessary for the image signal of the solid state image transducer to be read out. Meanwhile, the analogue gate AG1 is in the open state for the time during which a one-frame image is read out. For this reason, the head 13 is initially supplied with current after said time point $t_3$ (FIG. 6). Therefore, from the time $t_3$ onward, by the above mentioned various signals from the synchronizing signal generating circuit 10, the image signals produced in time sequence, that is, the image signals of proper exposure level stored in the time interval between the time $t_2$ and $t_3$ are read out from the solid state image transducer 2, then converted to the NTSC signals and video signals by the image signal processing circuit of FIG. 4 and the video recording signal generating circuit of FIG. 5. Then the video signals for a one-frame picture are applied to the head 13, and recording of the one-frame picture controlled to the proper exposure level is performed on one track of the recording medium 14. Thus, the exposure operation for the one-frame picture is completed.

However, the transistor 33 of FIG. 3 is instantaneously turned on by the inverted pulse $V_{LR}$ of the signal $V_{\phi P}$ produced at time point $t_3$ as mentioned, and therefore the condenser 32 is reset each time the image signal storing operation of the solid state image transducer 2 is completed. Thus, the control of storage time of an image signal for the next picture frame is renewed after the completion of the preceding image storing operation, and the image signal storing state of the solid state image transducer recovers the initial one each time the transfer to the vertical shift registers occurs. Such a procedure repeats itself until the release button is freed terminating a continuous succession of image signals recorded on the recording medium 14, while the level of each of the image signals is controlled in accordance with the concurrent level of the object brightness.

Each time the image signal storing operation of the solid state image transducer 2 is completed, the signal CP1 is produced, and this signal produces the signal $v_{\phi P}$ is produced to perform a reading operation of the image signal. At the same time to initiate the next image signal storing operation as initiated, so that the above operation is repeated continuously to effect continuous exposure.

When a single frame exposure is to be made, the switch 21 is connected to the contact (b), so that after the single frame exposure is completed, the gate circuit 22 is no longer responsive to the signal CP1, and is maintained in the closed state. Thus, the following recording operation is prevented from occurring.

Figure 1J:
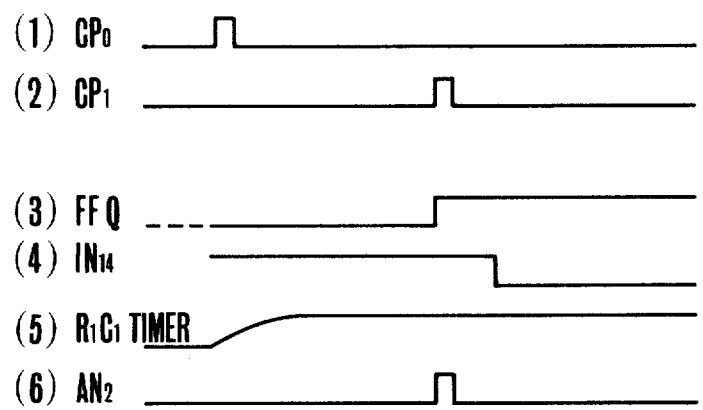
FIG. 1(j) is a pulse timing chart illustrating the manner in which the circuit of FIG. 1(h) may operate.

In other words, the single frame exposure mode, because the switch 21 is connected to the contact (b), when the release button is depressed, the one-shot circuit 19 of FIG. 1(h) produces a pulse CPo as shown in FIG. 1(j) at (1). In synchronism with the depression of the release button, the switch SW1 is turned on to supply the circuit of FIG. 1(h) with the voltage Vcc. Therefore, the timer circuit consisting of the resistor R1 and condenser C1 is actuated after the release, and increases its output as shown in FIG. 1(j) at (5), reaching a predetermined level after a predetermined time. During this time, the inverter IN3 produces a high level signal, and the AND gate AN1 and AN2 produce low level signals. Therefore, the flip-flop FF produces a low level signal from the Q output terminal as shown in FIG. 1(j) at (3). After that, when the timer circuit reaches the predetermined level, the inverter IN13 changes its output to the low level, and the reset state of the flip-flop FF is released to be settable. After the Flip Flop FF becomes settable in such manner, when the image storing operation on the transducer 2 is completed, the circuit 9 produces the pulse CP1. The pulse CP1 is fed to the AND gates AN1 and AN2 through the OR gate OR20. At this time, as the output of the timer consisting of the resistor R1 and condenser C1 reaches the predetermined level, and AND gate AN2 responsive to the pulse CP1 produces a pulse, the pulse is fed through the OR gate OR8 to the AND gate AN4 of FIG. 1(i). The other input of the gate AN4 is connected to the above described circuit 9, so that the AND gate AN4 causes the above described pulse CP1 to be passed therethrough to trigger the one-shot circuit ON10, and, as has been mentioned, the gate circuit 22 is opened during the time a one-frame image is read out, and the video signal is thus recorded. On the other hand, in response to the pulse CP1, the AND gate AN1 also produces a pulse, so that the flip-flop FF is set in synchronism with the CP1 to produce a high level signal from the Q output terminal as shown in FIG. 1(j) at (3). The timer composed of the resistor R1 and capacitor C1 is actuated after the Flip Flop FF is set, and reaches a predetermined level after a predetermined time. Therefore, the inverter IN14, as shown in FIG. 1(j) at (4), produces a low level signal after the pulse CP1 is produced. After that, even when CP1 is produced from the circuit 9, the AND gate AN2 remains in the closed state. Thus, the OR gate OR8 produces only the first one signal CP1, and the gate circuit 22 is held in the closed state after the first single frame image has been recorded to insure that only one frame exposure is performed.

The reason the gate circuit 22 is left closed until the image signal stored on the solid state image transducer 2 just before the actuation of release is read out, is that the image signal stored on the solid state image transducer 2 just before the release was not subject to the storage time control. Therefore, the image signal has no proper exposure level, is improper as the recording signal for the image.

FIGS. 7(a)(b)(c) are diagrams of the circuitry of another embodiment of the present invention, and the waveforms which explain the operation thereof. In this embodiment, as a number of image signals are produced in time sequence from the solid state image transducer to form single frame picture information, the maximum value of an image signal is detected and held. The storage time is varied so as to effect the entrance of the maximum value within a predetermined region of output voltages, and then the information for the object recorded on the magnetic recording medium after the optimum storage time is established. This system enables the solid state image transducer for image signal storage to serve as an photoelectric element for object brightness measurement. Thus, the exposure time control is effected by a single solid state device-.

In FIGS. 7(a)(b), reference characters denote the same parts as shown in the embodiment of FIGS. 1 to 6. In FIG. 7(a), a peak detecting circuit 100 detects a peak value of image signals produced in time sequence from the solid state image transducer 2. A discriminating circuit 101 discriminates whether the output of said peak detecting circuit 100 is in the predetermined voltage region. A storage time modifying circuit 102 shortens the storage time when the peak value based on the output of the discriminating circuit 101 is larger than the predetermined voltage region, and lengthens the storage time when the peak value is shorter than the predetermined voltage region. Upon detection, the peak value of the image signal outside the predetermined voltage region based on the output of the discriminating circuit to the recording head 13 of the video signal off the transmission of the video signal corresponding to the image signal. Upon occurrence of the peak value of the image signal within the predetermined voltage region, switching circuit 104 permits transmission of the video signals to the recording head 13. A reliable image recording is thus performed. Numeral 105 represents a condenser lens provided on the focusing screen 7, numeral 106 represents a penta prism, and numeral 107 an eye-piece lens. These parts constitute a finder optical system.

Figure 7B:
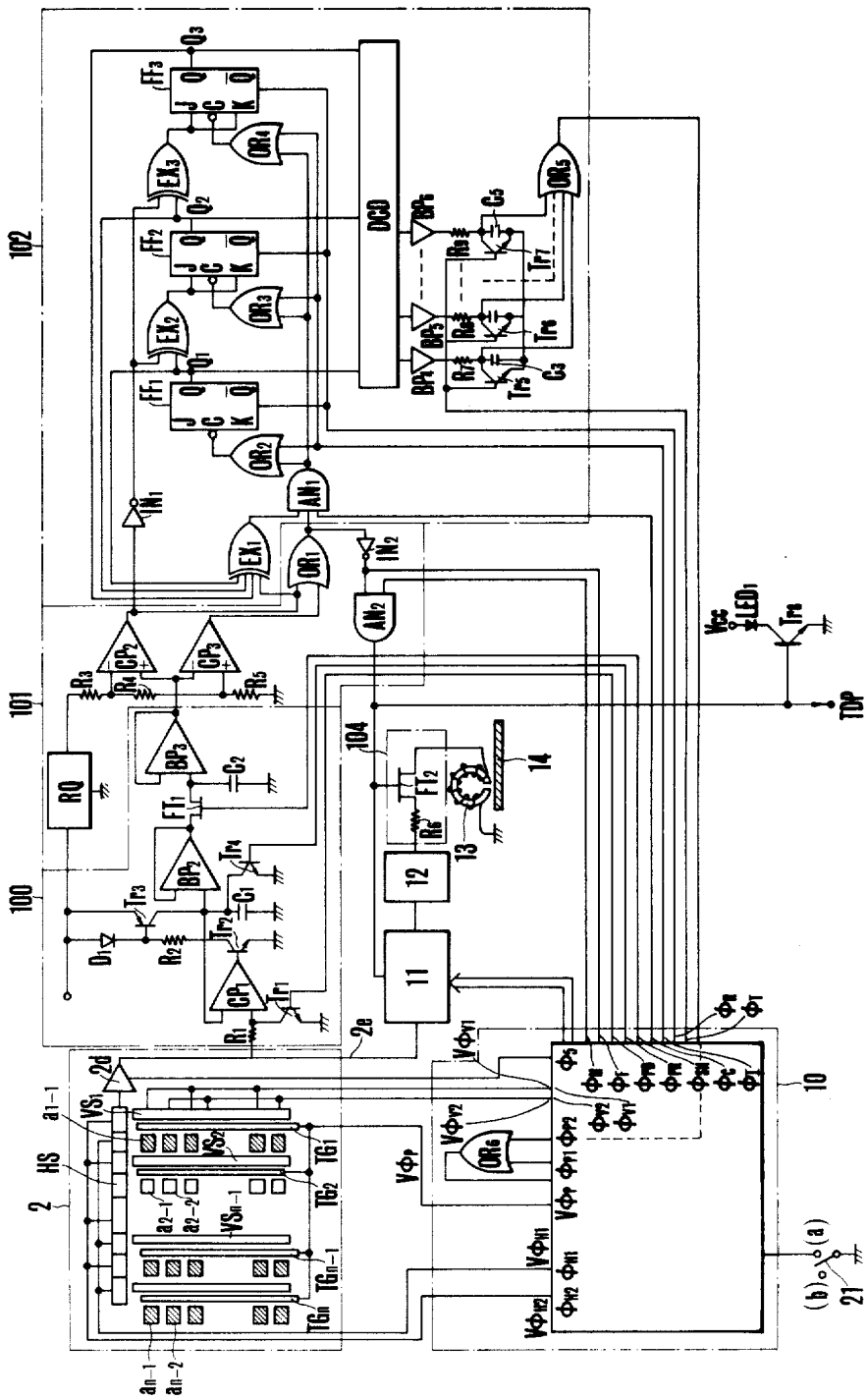

The details of the main parts of said FIG. 7(a) are FIG. 7(b) includes resistors R1-R9; transistors Tr1-Tr7; capacitors C1-C5; comparator circuits CP1-CP3; buffer amplifiers BP2-BP6; a diode D1; analog gates FT1, FT2; a constant voltage source RQ; inverters IN1, IN2; OR gates OR1-OR6; exclusive OR gates EX1-EX3; AND gates AN1, AN2; J-K flip-flops FF1-FF3; and a decoder DCD.

Block diagram 7(d) shows an example of the synchronizing signal generating circuit 10 of FIG. 7(b). In the diagram, 10a' denotes a solid state image transducer drive circuit shown in FIG. 7(e). This circuit is similar in construction to that shown in FIG. 1(c). Though a detailed explanation is omitted, the input of the inverter IN1 is connected to the output of the OR gate OR6 of FIG. 7(b). Numeral 10b' denotes a signal transmitting circuit similar to that shown in FIG. 1(e), and numeral 10c' denotes a signal forming circuit shown in FIG. 7(f).

Figure 7C:
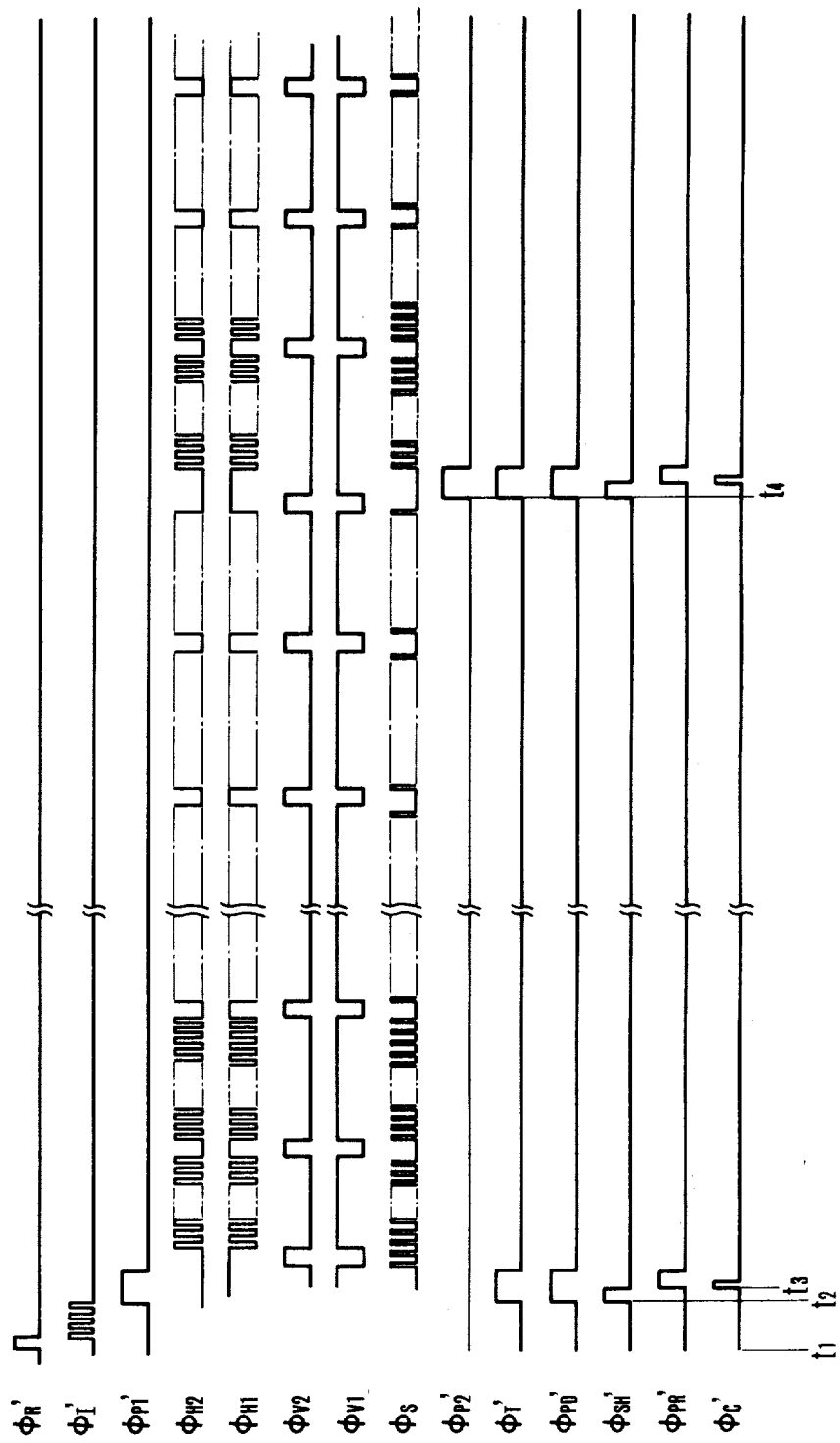
Figure 7E:
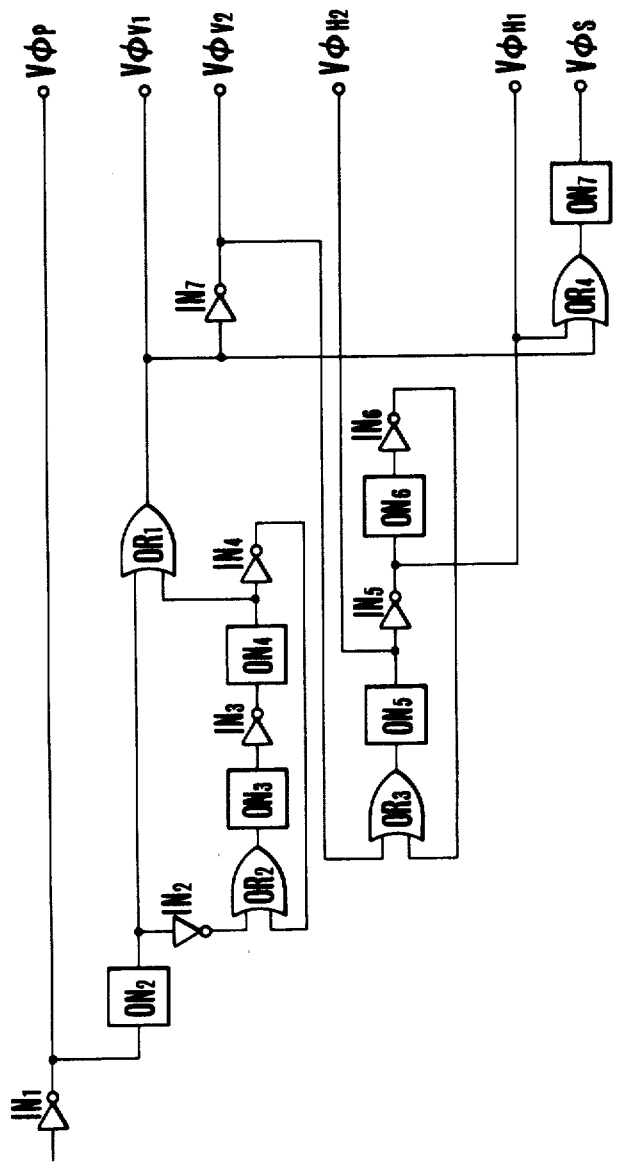
Figure 7F:
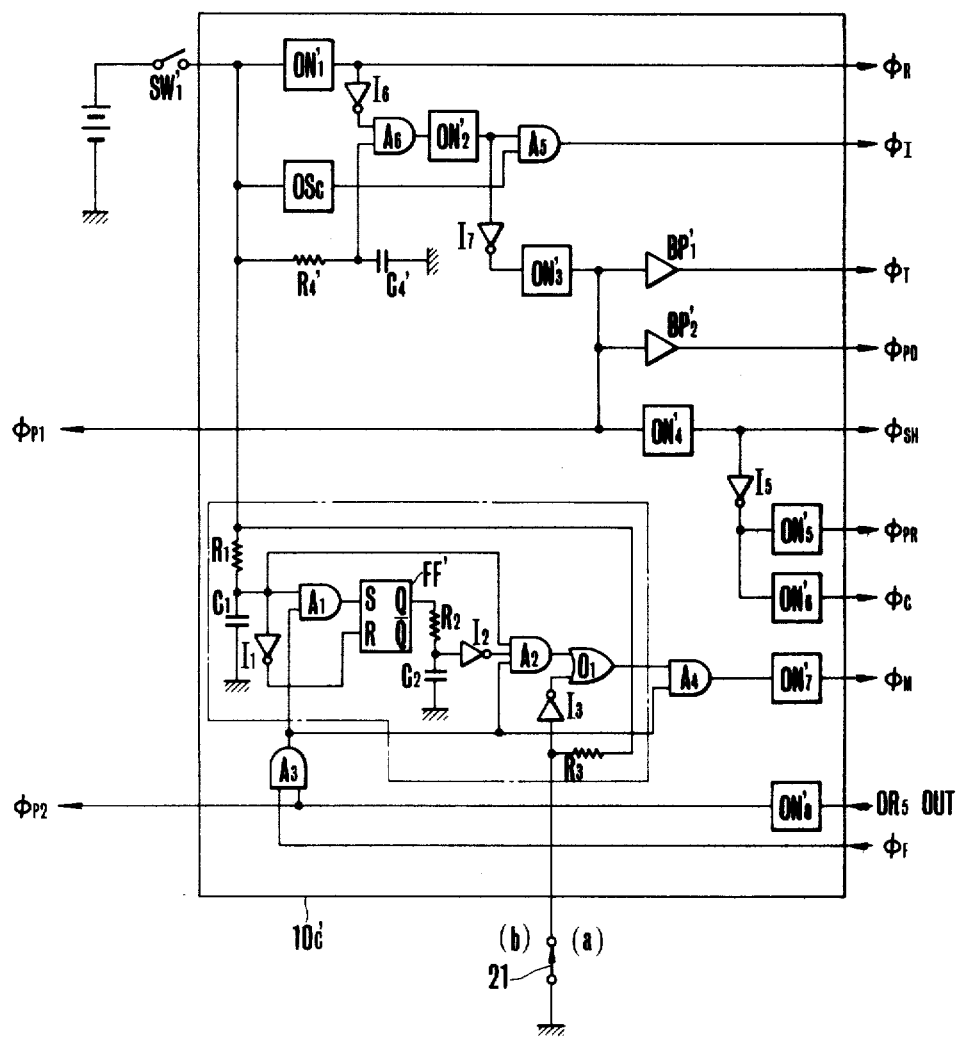

In FIG. 7(f), a switch SW' is arranged to close when a release button (not shown) is depressed. A one-shot circuit ON1' produces a pulse $\phi_R'$ of FIG. 7(c) and numerals R4' and C4' represent a resistor and a capacitor forming a timer circuit. The time constant of this circuit is set to be shorter than the time of the width of the pulse $\phi_R'$. Numeral I6 represents an inverter, while A6 represents AND gate which is opened when the pulse $\phi_R'$ from the one-shot ON1' is quenched, thus producing a high level. A one-shot circuit ONZ is triggered by the output of an AND gate A6 to produce a pulse of a predetermined time width. An AND gate A5 has one input connected to the one-shot circuit ON2' and another input connected to an oscillator OSC, causing pulses $\phi_I'$ of FIG. 7(c) to be passed during the time equal to the pulse width of the one-shot circuit ON2'. Numeral 17' represents an inverter. A one-shot circuit ON3' is triggered after the pulse of the one-shot circuit ON2' has vanished, so that a pulse $\phi_{PI}'$ of FIG. 7(c) is produced. Buffer amplifiers $B_p'$ and $B_{p2}'$ converts the pulse $\phi_{PI}'$ to a pulse $\phi_T'$, $\phi_{PD}'$ of FIG. 7(c). A is a one-shot circuit ON4' is triggered by the pulse of the one-shot circuit ON3' to produce a pulse $\phi_{SH}'$ of FIG. 7(c). Character 15 represents an inverter, while characters ON5' and ON6' represent one-shot circuits for producing pulses $\phi_{PR}'$ and $\phi_C'$ of FIG. 7(c) respectively when the pulse $\phi_{SH}'$ has vanished.

A circuit portion enclosed by a dashed line in FIG. 7(f) is similar in construction to that shown in FIG. 1(h). This circuit functions to always produce a high level signal from an OR gate 01 when in the continuous exposure mode, and to produce only one pulse from the AND gate A3 through the OR gate 01 when in the single frame exposure mode. A one-shot circuit, ON8' is triggered by the output of the OR gate OR5 of FIG. 7(b) to produce a pulse $\phi_{P2}'$ of FIG. 7(c). An AND gate having A3 has one input connected to the one-shot circuit ON8' and another input connected to the inverter IN2 of FIG. 7(b). A one-shot circuit ON7' is triggered by the output of the AND gate A4 to produce a pulse of a width corresponding to the reading time of the image signals for a one-frame picture.

The operation of the circuit of FIGS. 7(a) and 7(b) is described with reference to FIG. 7(c). When a shutter button of a camera is depressed, the synchronizing signal generating circuit 10 is rendered operative in a manner similar to that shown in connection with the preceding embodiment to produce the individual signals in time sequence as shown in FIG. 7(c) with the start of control operation. In other words, when a release is first actuated, the switch SW1' of FIG. 7(f) is closed in response to the release button, causing the one-shot circuit ON1' to produce the pulse $\phi_R'$ which is fed to the J-K flip-flops FF1-FF3. An up-and-down counter composed of flip-flops FF1-FF3, exclusive OR gates EX2 and EX3 and inverter IN1' is thus reset. Again, the pulse $\phi_R'$ is inverted by the inverter of FIG. 7(f), and applied to the AND gate A6, and then the AND gate A6 produces a high level signal which triggers the one-shot circuit ON2'. Therefore, a pulse is produced from the one-shot circuit ON2' which is then applied to the AND gate A5. Since the other input of said AND gate A5 is connected to the oscillator OSC, the AND gate A5 is opened to pass a clock pulse train $\phi_I'$ from the oscillator OSC therethrough during only the time interval equal to the width of the pulse produced from the one-shot circuit ON2'. These clock pulses are fed to the clock terminal C of the flip-flop through the OR gates OR2–OR4. Thus, a digital value corresponding to an initial storage time is set in an up-down counter comprising the flip-flops FF1–FF3. After the pulses $\phi_I'$ are produced in such manner during the time equal to the width of the pulse from the one-shot circuit ON2' of FIG. 7(f), the one-shot circuit ON3' of FIG. 7(f) is triggered at time $t_2$ in FIG. 7(c) to produce an output pulse which serves directly and after passage through the buffer amplifiers $B_{P1}'$ and $B_{P2}'$, as the pulses $\phi_T$, $\phi_{PD}'$ shown in FIG. 7(c).

The one-shot circuit ON4' is triggered by the pulse of the one-shot circuit ON3' to produce a pulse serving as the pulse $\phi_{SH}'$ shown in FIG. 7(c). This pulse $\phi_{PI}'$ is applied through the OR gate OR6 to the inverter IN1 of FIG. 7(e) and from there produced as the pulse $V_{\phi P}$, which is applied to the transfer gate of the solid state image transducer 2. Hence, the image signal stored on the solid state image transducer 2 before the actuation of release is transferred to and memorized in the vertical shift registers in a manner similar to that described in connection with the preceding embodiment. Again, in a manner similar to that in the preceding embodiment, pulses $V_{\phi 1}$, $V_{\phi 2}$, $V_{\phi H1}$, $V_{\phi H2}$ and $V_{\phi S}$ are produced to start an image signal from the solid state image transducer 2. Again, the pulse $\phi_T'$ instantaneously turns on the transistors Tr5–Tr7 of FIG. 7(b) are to reset the capacitors C3–C5 forming a time constant circuit for controlling the storage time. Again, the transistor Tr1 is instantaneously turned on so that the comparator circuit CP1 is rendered inoperative until the transistor Tr1 is turned off. Again, the pulse $\phi_{SH}'$ instantaneously turns on analog switch FT1, the image signal representing maximum level among the image signals stored on the first capacitor which holds the peak value during the preceding reading operation is transferred through the buffer amplifier BP2 to the second holding capacitor C2.

Next, at time $t_3$, the synchronizing signal generating circuit 10 produces the pulses $\phi_{PR}'$ and $\phi_C'$ from its output terminals $\phi_{PR}$ and $\phi_C$ respectively. The transistor Tr4 is instantaneously turned on by the pulse $\phi_{PR}'$ to reset the image signal of maximum level which was held in the capacitor C1 during the preceding image signal reading operation. In other words, when the pulse $\phi_{SH}'$ from the one-shot circuit ON4 of FIG. 7(f) has vanished, the output of the inverter I5 goes high at which the one-shot circuits ON5' and ON6' are triggered to produce the pulses $\phi_{PR}'$ and $\phi_C'$. Thus, the maximum brightness level signal among the image signals held in the capacitor C1 of FIG. 7(b) is reset.

Again, at this time, with the pulse $\phi_C'$, a discriminating operation is performed of whether or not the storage time information set in the UP-DOWN counter is revised. If the image signal in the preceding operation is of proper exposure level, the storing operation of the solid state image transducer 2 is controlled in accordance with the initially set storage time. In other words, the image signal which has the maximum level from the preceding operation is transferred to condenser C2 of FIG. 7(h) at the time point $t_2$. This level of the image signal is compared by the comparator circuits CP2 and CP3. If the level is not within the reference level from the reference voltage source RQ, either one of the comparator circuits CP2 and CP3 produces a "1" signal. If within the reference level, both comparator circuits produce "0" signals, the outputs are applied through the OR gate OR1 to the inputs of the AND gate AN1. For this reason, when the pulse $\phi_C'$ is produced, the output state of the AND gate AN1 is determined by the outputs of the comparator circuits CP2 and CP3. If the exposure level of the preceding image signal is proper, the AND gate AN1 continues to produce "0" output, and, if improper, the pulse $\phi_C'$ is applied through the AND gate AN1 and the OR gate to the UP-DOWN counter so that the preset storage time is revised one step.

Now, one of the image signals occurs just after the release is detected. As the charges on the photosensitive elements of the solid state image transducer 2 usually amount to an unnecessarily excessive, or saturated level before the release, the image signal read out just after the release and stored on the holding condenser C1 has an extremely high level. Therefore the output of the comparator circuit CP2 serves as "1" signal. At time point $t_3$ in FIG. 7(c), the content of the UP-DOWN counter advances one count. This causes the decoder DCD to select a time constant circuit corresponding to the new content of the UP-DOWN counter. This time constant circuit controls the storage time.

After the storage time is determined by the time constant circuit, at a time $t_4$, the pulse $\phi_{P2}'$ is produced through the OR gate OR5, and after having passed through OR gate OR6 serves as the transfer pulse $V_{\phi P}$ to be applied to the solid state image transducer 2. The image signal is thus stored during the aforesaid storage time, that is, during the first storing operation after the release is transferred to the vertical shift registers. Again, from the time $t_3$ onward, the image signals transferred at the time $t_2$ are read out in sequence in a manner similar to that described in connection with the first embodiment. Of the sequentially readout image signals, the maximum level is held by the capacitor C1 in a constant current type peak detecting circuit which comprises the comparator circuit CP1, transistor Tr2, resistor R2, diode D1, transistor Tr3 and condenser C1. For this reason, when the image signal is transferred to the vertical shift registers at the time $t_4$ as mentioned of the preceding image signal transferred to the condenser C1 which is of maximum level is again transferred to the capacitor C2 for a comparison by the comparator circuits CP2 and CP3. If the level of this image signal is not a proper exposure level, the content of the UP-DOWN counter is renewed so that the storing operation is performed for the renewed storage time.

Until the level of the image signal becomes proper for exposure, the storage time is gradually increased or decreased step by step. Such a storage time setting operation for proper exposure proceeds until both of comparator circuits CP1 and CP2 produce first "0" signals simultaneously. After that, the AND gate AN1 continues to produce "0" signal, and the renewed operation of the UP-DOWN counter discontinues. The time constant circuit which forms a given storage time for assurance of the proper exposure performs the following operation for control of the storage time. Again, on the other hand, since the output of the OR gate after passed through the inverter IN2, the output of the OR gate OR1 is applied to the input of the AND gate AN2. The AND gate AN2 produces "0" signal which lasts until the comparator circuits CP2 and CP3 both produce "0" signals, that is, until an image signal of the proper exposure level for the set value of storage time is obtained. When both of the comparator circuits CP2 and CP3 produce "0" signals, that is, when the storage time is set to a value for the proper exposure level in producing image signals, the AND gate AN2 initially produces a "1" signal. Therefore, only after the set value of storage time is found to be proper for the correct exposure level, the analogue switch FT2 is actuated to permit application of the video signals from the image signal processing circuit 11 and video recording signal generating circuit 12 to the head 13. Thus, the recording of image signal S begins on the recording medium 14. This recording operation of the image signals on the recording medium 14 is not performed until the image signal takes the proper exposure level to insure that the image signals recorded are all of the correct exposure level.

When the storage time is set to the proper value, as mentioned, the OR gate OR1 of FIG. 7(b) produces a low, and the inverter IN2 produces a high. The high signal is applied to the input terminal $\phi_F$ of the circuit 10. Therefore, the high is applied to one of the inputs of AND gate A3 of FIG. 7(f). Also at the time the storage time control starts, the high level signal produced from the OR gate OR5 of FIG. 7(b) triggers the one-shot circuit ON8' of FIG. 7(f) to produce the pulse $\phi_{P2}'$. This pulse is then applied from the AND gate A3 to the AND gate A4, and, when in the continuous exposure mode, through the AND gate A4 to the one-shot circuit ON7'. Therefore, the one-shot circuit ON7' produces a pulse $\phi_M$ which is maintained at a high level during the time image signals for a one-frame image are read out.

The pulse at $\phi_M$ is then applied to the AND gate AN2 of FIG. 7(b) to open the gate FT2 for that time. On the other hand, the pulse $\phi_{P2}'$ is applied through the OR gate OR6 to FIG. 7(b) to the inverter IN1 in FIG. 7(e), and then applied as the transfer pulse $V_{\phi P}$ to the image transducer 2. The image signals are thus read, and converted to NTSC signals by the image signal processing circuit 11 and to video signals by the video recording signal generating circuit 12. The video signals are applied through the gate FT2 to the head 13 by which they are recorded on the recording medium 14. After the signals of one-frame image have been recorded, the procedure is repeated with the signal from the OR gate OR5 in FIG. 7(b). Thus, a continuous succession of one-frame video signals are recorded.

When a single frame exposure mode is selected, since the switch 21 is connected to the contact (b) in FIG. 7(f), the AND gate A4 is made responsive to only one pulse applied through the AND gate A3 in a similar manner to that shown in FIG. 1(h). Thus, the one-shot circuit ON7' is the only one triggered, and the gate FT2 of FIG. 7(b) allows only one frame of video signals to be applied to the head 13 for a single frame image recording.

In FIG. 7(b) a light-emitting diode LED1 serves as an action lamp energized when the output of the AND gate AN2 changes to "1" and the recording operation of image signals on the recording medium starts. Again, the output of the AND gate AN2 is fed to a terminal TDP upon connection to a warning means such as buzzer, informing the operator that a recording operation is under progress. Again, the exclusive OR gate EX1 is arranged to produce "0" signal when the content of the UP-DOWN counter reaches the upper or lower limit value so that the renewing operation of the counter is inhibited. That is, the storage time remains unchanged thereafter; otherwise when the counter advances one count from the upper limit content, the lower limit content results. Likewise, the lower limit content of the counter is renewed in the next step to the upper limit one. Thus, the storage time is prevented from changing from the longest to shortest value, or from the shortest to longest value for more than one count of the counter. Again, the output terminal $\phi_S$ of the synchronizing signal generating circuit 10 of FIG. 7(b) is coincident with that of the circuit 10C' of FIG. 7(d) which circuit is similar in construction to that of FIG. 1(e). Through this output terminal, the synchronizing signals are applied to the image signal processing circuit of FIG. 7(b).

FIG. 8(a) is a block diagram showing still another embodiment of the present invention, where the same reference characters have been employed to denote the same elements as those shown in FIGS. 1 to 7. In FIG. 8(a), a diaphragm 300 is normally closed to shield the solid state image transducer 2 from light entering through the optics 1, except during exposure time. Thus, the solid state image transducer is protected from accidental damage by burning. A switching device or means 303 serves to transmit a diaphragm signal from an exposure control computing circuit 305 through a switching device or means 302 to a meter 301. A device or means 306 has two contacts (a) and (b). A connection to the contact (a) is effected by a signal from a switch 310 which is closed during the first step of a release stroke transmits a release button signal to the switching device 302. The switching device 302 is thus connected to the contact (a) to apply a voltage Vcc to the meter 301, which fully opens the diaphragm 300. A switch 311 closes when the release button 312 is depressed to the second stroke. The ON signal of switch 311 is applied to one input of an AND gate 309. An exposure time control timer circuit 307 is responsive to a pulse from a differentiation circuit 308 which changes its output from "1" to "0" level. Circuit 307 holds the "0" signal until one cycle of the image recording operation on the recording medium 14 is completed. After the image signals have been recorded, the "1" signal is recovered. Again, the exposure control computer circuit 305 responsive to the output of the AND gate 309 memorizes the output of the photoelectric element 6 and computes a diaphragm value and a value of storage time. A storage time control circuit 304 applies a storage time completion signal based on the storage time either preselected, or computed by the exposure computation control circuit 305, to the synchronizing signal generating circuit 10. The synchronizing signal generating circuit 10 produces the transfer pulse $V_{\phi P}$ which causes the image signals stored on the solid state image transducer 2 to be memorized in the vertical shift registers as mentioned. Again, the synchronizing signal generating circuit 10 responsive to the output of the AND gate 309 is rendered operative to produce the transfer pulse $V_{\phi P}$, and to perform transfer of the image signals before the release. Again, the synchronizing signal generating circuit 10 produces a signal which opens the gate circuit when the control of the storage time by the storage time control circuit has been completed, causing the image signal exposed during the controlled time by the storage time control circuit to be fed to the head 13 as the video signals.

Figure 8B:
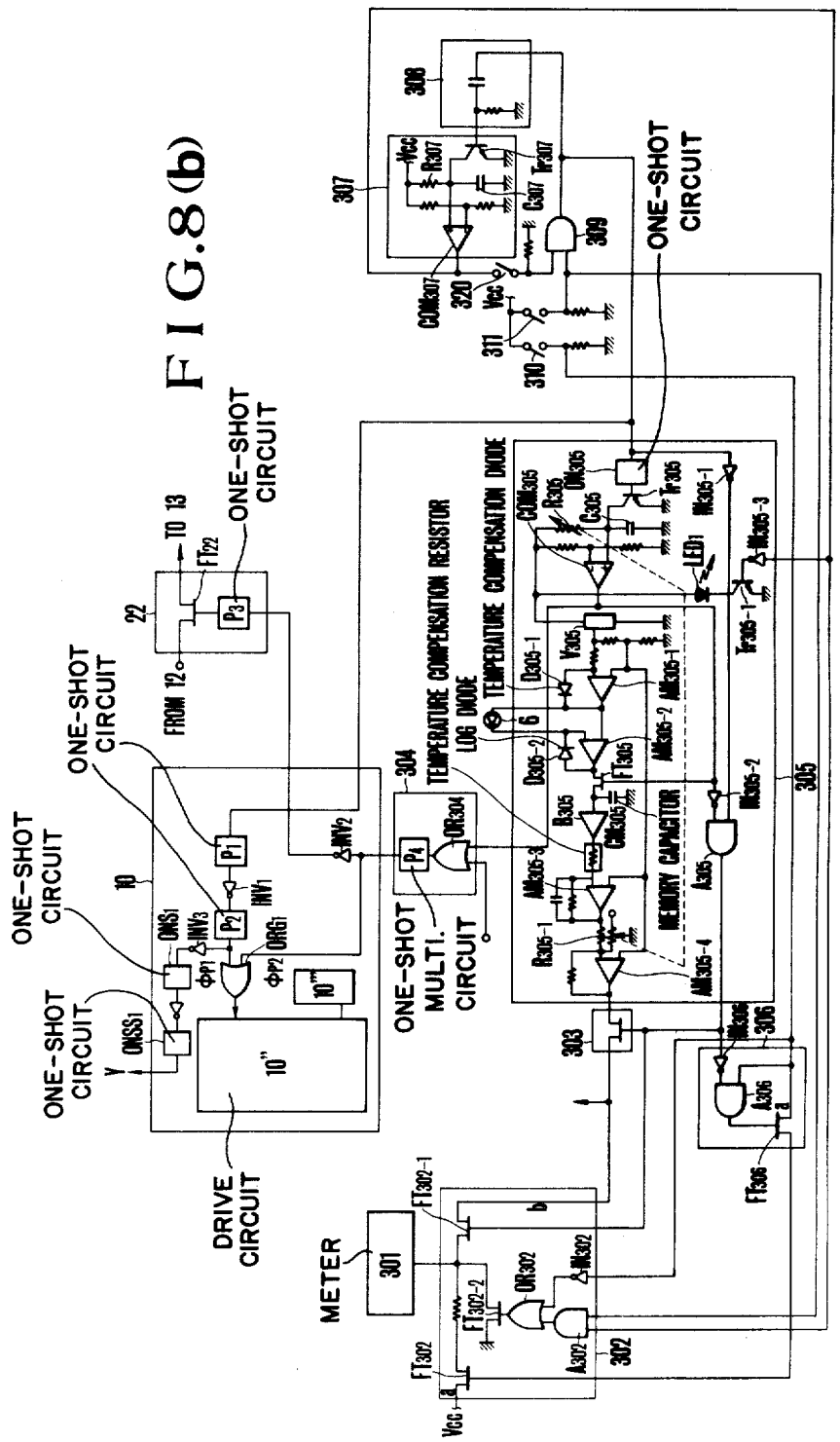
FIG. 8(b) illustrates the details of the circuits of FIG. 8(a).

FIG. 8(b) shows the details of the essential parts of FIG. 8(a). In said FIG. 8(a), a storage time preset type exposure control computer circuit is utilized as the exposure control computer circuit 305. A timer circuit indicated at 307 is formed by a time constant circuit composed of a resistor R307 and a condenser C307, a comparator COM307 and a transistor Tr307. Similarly, circuit 305 is composed of a one-shot circuit ON305, a transistor Tr305, a variable resistor R305 with a resistance value varied in cooperation with a time setting dial (not shown), and a condenser C305 forming a timer for regulating the storage time together with the resistor R305. Also included in circuit 305 is a comparator COM305, a constant voltage circuit V305, an amplifier AM305-1, a diode D305-1 forming a temperature compensation amplifier together with the amplifier AM305-1; and a light measuring amplifier AM305-2 with an input and output across which a diode D305-2 is connected. A gate FT305 in circuit 305 represents a connected to the output of the comparator COM305 and functions as a memory switch. Numeral CM305 represents a memory condenser, numeral B305 a buffer amplifier, and numeral AM305-3 is an amplifier. A computation amplifier AM305-4 takes storage time information set in a resistor R305-1 cooperative with the resistor R305 and brightness information memorized on the condenser CM305 to compute a diaphragm value which provides a proper exposure level. Also included in circuit 305 are inverters; IN305-1 and IN305-2, an AND gate A305, and an inverter IN305-3 which is connected to the output of the timer circuit 307. A transistor Tr305-1 is turned on by the output of the inverter IN3053 to energize LED, LED1 for display. Again, the switching means of 306 is formed from an inverter IN306, an AND gate A306 and an analog gate FT306. The opening and closing operation of said switching means 306 is controlled by the output of the AND gate A305. The switching means of 302 is formed from analogue gates FT302, FT302-1 and FT302-2, an inverter IN302, AN AND gate A302, and an OR gate OR302. Again a storage time control circuit of 304 is formed from a one-shot circuit P4 and an OR gate OR304. The synchronizing signal generating circuit 10 is formed from inverters INV1 to INV3, one-shot circuits P1, P2, ONS1 and ONSS1, and OR gate ORG1, a drive circuit 10", and a signal transmitting circuit 10'". The drive circuit 10" is the same as that shown in FIG. 7(e), and the signal transmitting circuits 10'" is substantially the same as that shown in FIG. 1(e), so their explanation is omitted. A gate circuit 20 is formed of a one-shot circuit P3 for producing a pulse whose width is equal to the time of reading out a one-frame image, and an analog gate FT22.

The operation of the embodiment of FIGS. 8(a) to 8(f) is as follows: When the release button 312 is depressed a first step, the switch 310 is closed. Responsive to this, the switching device 306 is set to the contact (a) to produce the ON signal which is applied to the switching device 302 which is thereby set to its contact (a) so the voltage Vcc is applied to the meter 301. In other words, as shown in FIG. 8(b), the AND gate of the switch means 306 is opened, i.e., turned on or enabled by the opening of the switch 310, and the gate FT306 is opened, i.e. turned on to apply the high level signal through the switch 310 and gate FT306 to the gate FT302 of the switching device 302. The gate FT302 is thus turned on. Therefore, the voltage Vcc is applied through the FT302 to the meter 301. For this reason, the pointer of the meter 301 is deflected to the maximum value, and the diaphragm which cooperates with the meter pointer is now fully opened so that light from the object being photographed is incident upon the photoelectric element 6 for light metering operation at the full open aperture. The photoelectric element produces a brightness signal which is applied to the exposure computation control circuit 305.

Figure 8C:
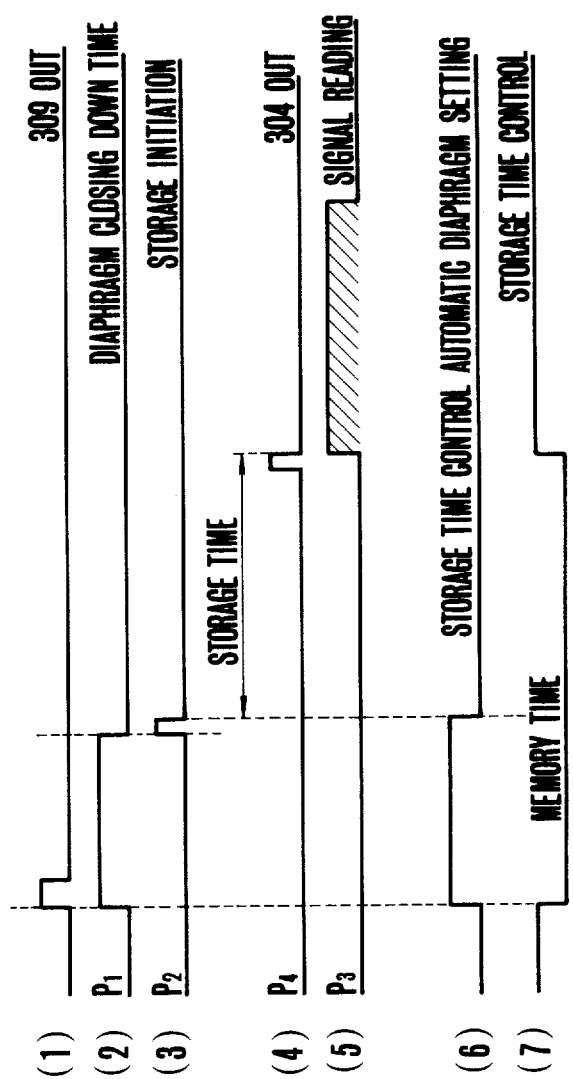
FIG. 8(c) is a diagram of waveforms showing the manner in which the circuit of FIG. 8(b) may operate.

After that, when the release button 312 is further depressed, the switch 311 is turned on causing the AND gate 309 to produce a "1" signal which is applied to the exposure computation control circuit 305 that memorizes the above brightness signal. In other words, since the capacitor C307 of the timer circuit 307 in FIG. 8(b) is charged in the initial state, and the comparator COM307 produces a high level signal which is applied through the switch 320 to the AND gate 309 at one input thereof, the ON operation of the switch 311 causes the AND gate 309 to produce the high level signal. The high level signal causes the differentiation circuit 308 to produce a differentiation pulse, causing the transistor Tr307 of the timer circuit to be instantaneously turned on to discharge the charge stored on the capacitor C307. Therefore, the comparator COM307 produces a low level signal which closes i.e., turns off the AND gate 309. Therefore, when the switch 311 is turned on, the AND gate 309 produces a pulse as shown in FIG. 8(c) at (1). The pulse of the AND gate 309 is fed to the one-shot circuit ON305. The latter circuit is triggered to produce a pulse shown in FIG. 8(c) at (6). Therefore, the transistor Tr305 is turned on for a predetermined time, and short-circuits the capacitor C305 for the predetermined time, causing the comparator COM305 to produce a low level signal, and therefore causing the gate Ft305 to be turned off. Thus, the brightness information caused by the light that has been received by the photoelectric element 6 is memorized on the condenser CM305.

The signal from the AND gate 309 is also fed to the switching devices 303 and 306 to turn the switching device 303 on, and set the switching means 306 to the contact (b). The computed diaphragm value is then fed through the switching device 303 to the switching device menas 302. The diaphragm value signal is now applied to the meter 301 through the contact (b) of the switching means 302, and the diaphragm 300 is closed down to the computed diaphragm value. That is, when the pulse from the AND gate 309 ends, the inverter IN3051 produces a high level signal, and, as mentioned above, since the comparator COM305 produces a low level signal and the output the inverter IN3052 is of high, the AND gate A305 produces a high level signal, so that the switching device 303 is turned on. Because the gate FT302-1 of the switching means 302 is turned on by the output of the AND gate A305, the computed diaphragm value is applied through the switch means 303, and gate FT302-1 to the meter 301. Thus, the diaphragm 300 is closed down to the computed diaphragm setting. It is noted that at this time the output of the inverter IN306 is changed to low by the output of the AND gate A305 to close the AND gate A306, and to turn off the FT306. Therefore, the FETFT302 is turned off to remove the influence of the voltage Vcc which was applied to the meter 301 through the device FT302.

The "1" signal from the AND gate 309 is applied as a start signal to the synchronizing signal generating circuit 10. The circuit 10 is thus rendered operative, and the transfer pulse $V_{\phi P}$ is fed to the solid state image transducer 2. The image signal stored before the release is transferred to the vertical shift register in transducer 2, and is converted to video signals by the above mentioned operation which are then applied to the head 13. At this time, however, the gate circuit 22 is not yet open as will be described, and recording of the image signal before the release is not performed. Again, in synchronism with the transfer pulse $V_{\phi P}$, the time control of the set storage time is initiated by the storage time control circuit 304. After a time based on the said set storage time, the next transfer pulse $V_{\phi P}$ is produced to terminate the storing operation of the image signal on the solid state image transducer 2. Thus, the image signal stored on the solid state image transducer 2 during the storage time is transferred to the vertical shift registers in transducer 2.

At this time, the signal from the synchronizing signal generating circuit 10 is fed to the gate circuit 22, and the gate circuit is opened to feed the head 13 with video signals corresponding to the image signal controlled for the storage time. Thus, a one-frame image is recorded on the recording medium 14. When the recording of the image signal has been completed, the output of the timer circuit 307 is inverted from "0" to "1". For this reason, if the release button 312 continues to be depressed, the AND gate 309 produces a second "1" signal. Thus, the above described operation is repeated to perform a continuous succession of one-frame exposures. In more detail, since the output of the AND gate 309 is fed to the one-shot circuit P1 in FIG. 8(b), the latter produces a pulse shown in FIG. 8(c) at (2). Therefore, when the pulse has ended, a high level signal is fed through the inverter INV1 to the one-shot circuit P2 so that the latter produces an output pulse shown in FIG. 8(c) at (3). This pulse is fed through the OR gate ORG1 to the drive circuit 10'. Since said circuit 10" has the same construction as that of the circuit shown in FIG. 7(e), the above mentioned pulses $V_{\phi P}$, $V_{\phi V1}$, $V_{\phi V2}$, $V_{\phi H1}$, $V_{\phi H2}$ and $V_{\phi S}$ are produced in response to the pulse from gate ORG1 to perform a reading operation of the image signal and to initiate a storing operation of the image signal. As a result of the above, the image signal is converted to the NTSC signal and video signals by the image signal processing circuit 11 and video recording signal generating circuit 12 respectively, and is then applied to the gate circuit 22. It is noted that at this time the gate circuit 22 is off, so that no image signal recording is performed. Because the pulse width time produced by the one-shot circuit ON305 is made equal to the sum of the pulse width times of the pulses from the one-shot circuits P1, P2, the pulse (6) in FIG. 8(c) of the one-shot circuit ON305 ends at the time at which the pulse from the one-shot circuit P2 ends, that is, in synchronism with the time at which the storing operation of the image signal is initiated by the pulse $V_{\phi P}$. Therefore, the transistor Tr305 is turned off at that time.

The timer circuit composed of the resistor R305 and capacitor C305 now starts to operate. Since the resistor R305 is adjusted to the value set by the storage time setting dial (not shown) (exposure time setting dial), the output of the timer circuit reaches a predetermined level after the set time. At this time, therefore, the comparator COM305 is inverted to produce a high level signal which triggers the one-shot circuit P4 of the storage time control circuit 304. The circuit P4 produces a pulse shown in FIG. 8(c) at (4). This pulse is fed through the OR gate ORG1 to the circuit 10". This results in reading of the image signal exposed during the above set value of storage time.

The pulse from the one-shot circuit P4 is applied through the inverter INV2 to the one-shot circuit P3 which produces a pulse of a width equal to the time during which the image signal for the one-frame image can be read out as shown in FIG. 8(c) at (5). Therefore, the gate FT22 allows the image signal for one-frame image to be fed to the head 13, and the video signal corresponding to the image signal whose exposure level is controlled so as to become proper.

When the one-frame image recording is completed in this manner, the output of the timer circuit composed of the resistor R307 and the compacitor C307 has reached the predetermined level, and the comparator COM307 is inverted. The AND gate 309 then again produces a pulse to repeat the above described operation. Thus, a continuous succession of exposures are performed.

Such succession of exposures continue until the depression of the release button 312 stops. When the release button is released, the exposure is terminated. As shown in FIG. 8(a), release of the release button shifts the switching device 302 to the contact (c) to close the diaphragm entirely and to terminate the duration of all the exposures. That is, when the release button is no longer depressed, the switches 310 and 311 are turned off, and the AND gate 309 is also closed, so the exposure operation that follows is terminated. As shown in FIG. 8(b), by turning off of the switch 310, a high level signal is produced by the inverter IN302, and the gate FT302-2 is turned on through the OR gate OR302. Thus, the meter 301 receives almost a ground potential, and the diaphragm is entirely closed.

While a continuous succession of frames are exposed as described, a single frame exposure is obtained as follows. In the single frame exposure mode, the normally closed switch 320 is turned off when the release button is depressed further to the second step of its stroke, so that after a single-frame image has been recorded, a "1" signal is no longer produced by the AND gate 309. In this way, the single frame exposure is completed, and the exposure operation is terminated. Again, when in the single frame exposure mode, the inversion of the output of the timer circuit 307 from the "0" to "1" signal after the completion of recording of the single frame image results in the connection of the switching device 302 to the contact (c). Thus, as soon as the exposure is completed, the diaphragm is entirely closed. That is, when recording of the image has been completed, the timer 307 produces a high signal and therefore the AND gate A302 produces a high signal which is applied through the OR gate OR302 to the gate FT302-2. Therefore, the gate FT302-2 is turned on to close the diaphragm as mentioned. In the above described procedure, the output of the timer circuit 307 is applied to the exposure computation control circuit 305. Therefore, when the output of the timer circuit is "0", that is, between the moment at which the release is actuated and the moment at which the image recording is completed, the warning circuit is rendered operative by the "0" signal to indicate with a lamp or the like that the exposure operation is in progress. That is, the output of the timer circuit 307 is applied through the inverter IN3053 of FIG. 8(b) to the transistor Tr305-1, so the transistor Tr305-1 is turned on and maintained in this state during the time the output of the timer circuit is "0". Thus the LED, LED1 are energized to inform the operator of the fact that the exposure operation is under progress.

While the above described operation is exemplified for a preselected storage time, the diaphragm value may be preselected such as in the diaphragm preselection automatic exposure mode. The storage time is then determined based on the brightness signal and the diaphragm value preselected by an exposure computation control circuit. Therefore, the period of the storing operation of an image signal on the solid state image transducer 2 is limited by the computed storage time, and the diaphragm 300 is controlled by the set diaphragm value. However, for exposure with a preselected diaphragm preselection exposure, the exposure computation control circuit 305 in FIG. 8(b) is adapted for diaphragm priority as shown in FIG. 8(d) and may be used in connection with the other circuit portions of FIG. 8(a) and FIG. 8(b).

Figure 8D:
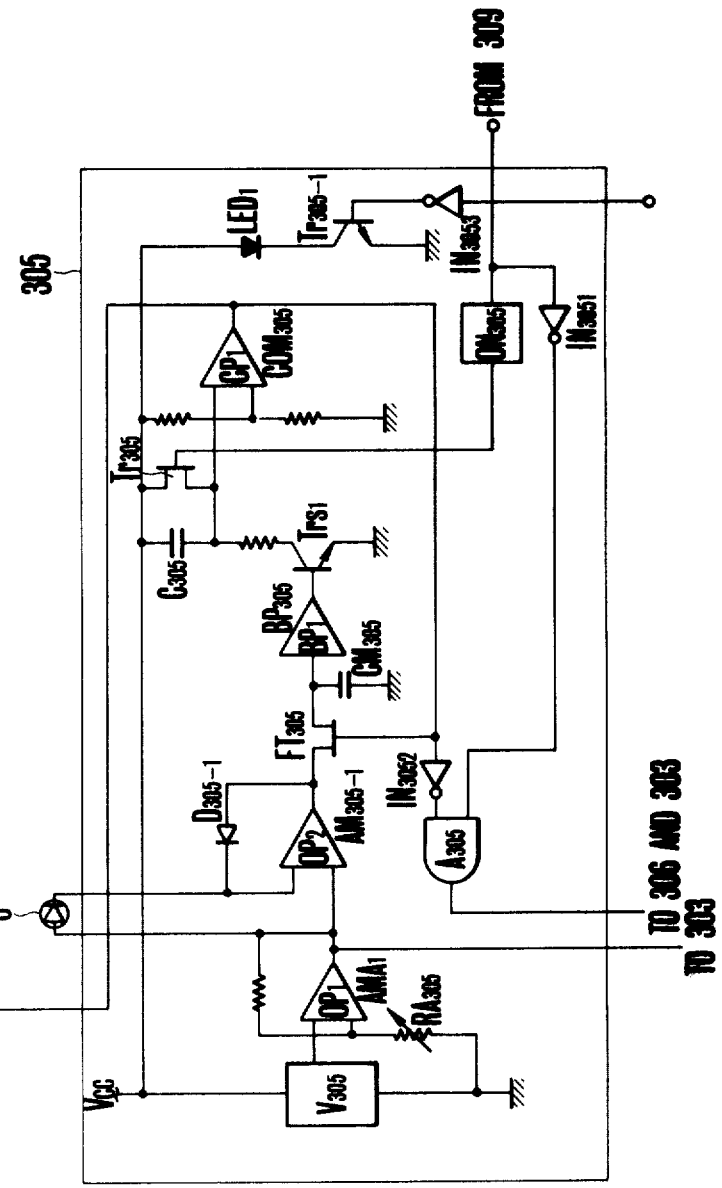
FIG. 8(d) is a circuit diagram of another practical example of the circuit 305 of FIG. 8(a).

In FIG. 8(d), the same constituent elements as those shown in FIG. 8(b) are designated by the same reference characters, and only different points are explained below. Here, a variable resistor RA305 cooperates with a diaphragm setting ring (not shown), and a voltage corresponding to the resistance of the resistor RA305 is produced by an amplifier AMA1. The output of said amplifier AMA1 is fed to the switch device 303 of FIG. 8(b), and the needle of the meter 301 shown in FIG. 8(a) and FIG. 8(b) is deflected an angle based on the preset diaphragm value so that the diaphragm is controlled during exposure. The output of the amplifier AMA1 is applied to an amplifier AM305-1, so that the preset diaphragm value and brightness information are processed to derive a storage time which makes the exposure level of image signal proper, and which is memorized in the capacitor CM305.

A transistor TrS1 elongates the memorized storage time information of the capacitor CM305, with the capacitor C305 being charged by the output current of said transistor. The output of the capacitor C305 is connected to the comparator COM305 so that when the output of the capacitor C305 has reached a predetermined level, the comparator is inverted to trigger the one-shot circuit of the circuit 304. Therefore, the diaphragm priority exposure, the diaphragm is controlled on the basis of the preset value of the diaphragm aperture, and the storing operation of the image signal is performed with the computed storage time.

For operation in the so-called magic exposure mode, the exposure computation control circuit 305 may be modified so that when the computed diaphragm value or storage time exceeds the limit of diaphragm value, or storage time available, the preset value of diaphragm aperture or storage time is altered based on said limit of diaphragm value of storage time to effect a proper exposure.

For operation in the program mode, the exposure computation circuit may be modified so that the diaphragm value and storage time are controlled in accordance with the brightness signal from the photoelectric element 6 to effect an exposure control with the computed values of diaphragm aperture and storage time.

Since the exposure control operation in such mode is quite the same as that described in connection with the storage time setting mode, the detailed explanation therefor is omitted.

Two flash devices which are used when in the flash exposure mode will be explained below.

Figure 8E:
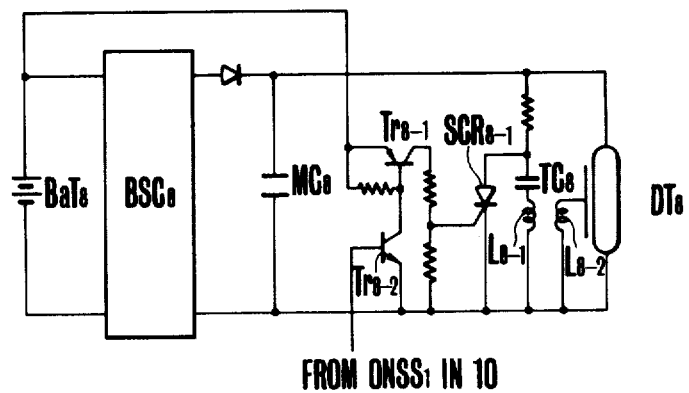
FIGS. 8(e) and 8(f) are circuit diagrams of two different examples of flash tube firing circuits adapted for use with the camera of FIGS. 8(a) to 8(d).
Figure 8F:
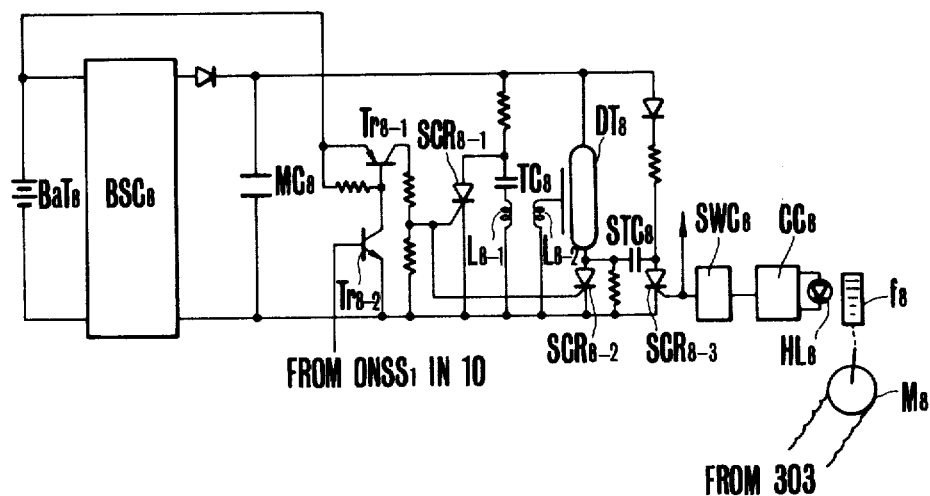

FIGS. 8(e) and 8(f) show embodiments of an ordinary flash device and a so-called computer strobe which are used in the flash exposure mode. Their circuits are both known in the art, and their detailed explanation is omitted. The circuit of FIG. 8(e) includes an electrical power source; BaT8 a booster circuit; BSC8, a main condenser MC8 switching transistors TR8-1 and Tr8-2, the base of the transistor Tr8-2 being connected to the output of one-shot circuit ONSS1 of FIG. 8(b); a thyristor SCR8-1, a trigger capacitor TC8, trigger coils L8-1 and L8-2 and a discharge tube DT8. The circuit of FIG. 8(f) also includes these elements, but further includes thyristors SCR8-2 and SCR8-3, a commutation condenser STC8, a light-receiving element HL8, an integrating circuit CC8 for integrating the amount of light received by the light-receiving element HL8, and a switching circuit SWC8 responsive to the output of the integrating circuit for producing a high level signal. The output of said switching circuit SWC8 is connected to the OR gate OR304 of FIG. 8(b) at one input thereof. Again, member M8 is a meter to which is applied a voltage corresponding to the diaphragm value in the form of a voltage from the switching means 303. A filter f8 is positioned in front of the light-receiving element HL8 to control the light incident upon the light-receiving element HL8 in accordance with the angle of deflection of the meter M8.

When an exposure is made using the flash device of FIG. 8(e), the latter 8(e) is attached to the camera of FIG. 8(a)(b) with the output of the one-shot circuit ONSS1 of the synchronizing signal generating circuit 10 of FIG. 8(a)(b) connected to the base of the transistor Tr8-2 of FIG. 8(e). In this state, when the release button is depressed to initiate an exposure operation as mentioned, the one-shot circuit P2 of FIG. 8(b) produces a pulse which is applied through the OR gate ORG1 to the circuit 10''. The image storing operation of the image transducer is then initiated. The pulse is also applied through the inverter INV3 to the one-shot circuit ONS1 to trigger the later. Since the pulse width produced by the one-shot circuit ONS1 corresponds to the period of the reading operation for every one frame image signal, after the initiation of image storing operation, when the image signal for one-frame image has been read out, the one-shot circuit ONSS1 is triggered through the inverter. The pulse from the one-shot circuit ONSS1 is applied to the transistor Tr8-2 in FIG. 8(e), and turns on the transistors Tr8-1 and Tr8-2. Then, the thyristor SCR8-1 is now turned on to discharge the charge on the trigger capacitor TC8 and trigger the flash discharge tube DT8 to emit flash. After the flash light is thus produced, as mentioned, the elapse of the preset storage time is followed by the initiation of reading the image signal. Thus, the flash exposure is completed.

When a where flash exposure is made by using the computer strobe of FIG. 8(f), at first, the output terminal of the one-shot circuit ONSS1 of FIG. 8(b) must be connected to the base of the transistor Tr8-2 of FIG. 8(f), and then the output terminal of 303 and one of the inputs of the OR gate OR304 of the circuit 304 of FIG. 8(b) are connected to the output terminals of the meter M8 and switching circuit SWC8 of FIG. 8(f). In this state, when the release operation is performed, as mentioned, the image storing operation is initiated, then the reading operation of the signals for one-frame image is completed, then a the one-shot circuit ONSS1 produces a pulse, then flash is produced, then the light of the flash after being reflected passes through the filter f8 to the light-receiving element HL8, and then the integrating integrating circuit CC8 integrates signals representing the amount of light. As a result, when the amount of reflected flash light has reached a predetermined level, the switching circuit SWC8 is actuated to turn on the thyristor SCR8-3. Thus, the flash is stopped in a manner known in the art. On the other hand, the output of the switching circuit is applied through the OR gate OR304 to trigger the one-shot circuit P4. After that, as mentioned, the storing operation of the image signal is completed, then the image signal exposed to the flash light is read out, and then the flash exposure is terminated.

It is to be understood that in the case of exposure by the computer strobe, the storage time is controlled by the flash stopping signal from the computer strobe. Thus, when the proper exposure level is attained, the storing operation is terminated. It is noted that at this time, the angle of deflection of the meter M8 corresponds to the computed value of diaphragm aperture, and such diaphragm information is introduced into the flash device by the filter f8. This makes possible an accurate exposure control. Again, the time at which the flash tube is fired occurs after the storing operation is initiated and after the reading operation of signals for the one-frame image is terminated. Therefore, the image signal readout is always regulated to a value corresponding to the amount of flash light.

FIG. 10 is a block diagram showing another embodiment of the exposure computation control circuit 305 of FIG. 8(a). This circuit is adapted to perform exposure in the various modes. The details of this circuit are described in Japanese Patent Application Sho No. 53-36379. Accordingly, the detailed description thereof is omitted, but its outline will be sketched below. In FIG. 10, block A is a control circuit for daylight photography; block B is a control circuit for flash photography. Block a includes a mode changeover switch SW201 for selecting one of the modes; a shift switch SW02 for selection the set value of storage time for the image transducer 2 or of diaphragm aperture, the pole of the switch SW202 being switchable to any one of three positions (a), (b) and (c); a frame number setting switch SW203, the number of frames depending upon the capacity of a recording medium loaded in the camera; a frame counter switch SW204 which is closed each time a one-frame exposure is completed; a switch SW205 for starting an oscillator circuit arranged to be closed in cooperation with the switches SW201 and SW203. The switch 205 is automatically closed when the switch SW202 is connected to either one of the contacts (a) and (c). Block A further includes a control gate 201; an oscillator circuit; 202; a counter group 203 for memorizing set information; a circuit 204 for comparing the set frame number with the number of frames exposed and increased one frame each time the switch SW204 is closed for every one frame exposure; a warning circuit 205 responsive to the output of the comparing circuit 204 for producing a warning signal in the form of sound or light when the number of frames exposed coincides with the set frame number available; a decoder driver 206 cooperative with a block 207 for displaying the information stored in the counter group as viewed from the outside of the camera; an A-D converter circuit 208 for converting the analogue output of the photoelectric element 6 to a digital output which is memorized in response to the output of an AND gate 309; an adder circuit 209; a switch group SW206 composed of code switches in which the full open diaphragm value of the lens is set; a register 210 for memorizing the exposure mode and a register for memorizing the set exposure information, that is, storage time for the image transducer, or diaphragm value; and a subtractor circuit 211 for subtracting the set exposure information value from the output of the adder circuit 209.A multiplexer 212 receives the set exposure information and the computed exposure information from the blocks 210 and 211 respectively and responds to the exposure mode for producing an output representative of the storage time or diaphragm value. A comparator circuit compares the storage time and diaphragm value with their respective limit values. A decoder driver 214 receives informations representative of the storage time, diaphragm value and the comparison result from the block 213 for driving a display device 215 positioned in the finder to display the various data. A selector switch SW207 changes the path of the signal from the photoelectric element 6 when the daylight photography is changed to the flash photography, or vice versa. An integrator 216 controls the storage time of the solid state image transducer in accordance with the output signal from the light-receiving element when in the flash mode. The block A further includes a circuit 217 for producing a sound or light at the start of an exposure so that the operator is aware of that fact; a time elongating circuit 218 for the production of an actual time and a D/A converter 219. In this embodiment, the circuit is actuated by the transfer pulse $V_{\phi P}$ from the synchronizing signal generating circuit 10 (FIG. 8(a)).

In operation before the actuation of release, either one of the daylight flash exposure modes is first selected. When the daylight exposure mode is selected, the switch SW207 is connected to the contact (a) manually or automatically in response to the removal of the flash device from the camera. Next, a desired control mode is selected. When the mode switch SW201 is turned on, and when the oscillator start switch SW205 is closed, a pulse train from the oscillator circuit 202 is passed to the control gate 201 where the pulses appear at a selected one of the output terminals thereof. The selected output terminal is connected to the mode setting counter in the counter group 203. In other words, as long as the mode switch SW201 and oscillation switch SW205 are simultaneously depressed, the number of pulses counted by that counter is being varied, for example, from a binary coded number [0000] through [0001], [0010], [0011], [0100], and so on for the exposure control modes such as the storage time priority mode, diaphragm priority mode, storage time priority magic mode, diaphragm priority magic mode, program mode and so on.

Setting of a desired value of storage time, or diaphragm aperture, and of the maximum number of frames available in the recording medium loaded in the camera is performed in a similar manner. That is, when the shift switch SW202 is set to the contact (a), as the oscillation start switch SW205 cooperating with the shift switch SW202 is closed, the pulses from the oscillator 202 are immediately applied through the control gate 201 to the exposure information value setting counter in the counter group 203. Thus, the counter counts up the pulses during the operation of the shift switch SW202.

On the other hand, when the shift switch SW202 is connected to the contact (b), the counter continues to count down. At this time, if the selected mode is the storage time priority mode, the value set in the exposure information value setting counter stands for the storage time. If it is the diaphragm priority mode, the value stands for the diaphragm value. When the maximum possible number of frames are set, the oscillation switch SW205 and frame number setting switch SW203 are simultaneously ON to select the one of the counters in the group 203 which is adapted for setting the frame number. The pulse from the switch SW204 which is closed each time an exposure is completed is directly applied to the one of the counters in the group 203 which is adapted to count the number of frame exposed, independently of the oscillation circuit. The number of frames exposed is compared with the number of frames set before the initiation of camera operation The result is representative of the recording capacity of the recording medium by the frame comparing circuit 204 upon occurrence of a small number of frames left unexposed, or upon occurrence of the coincidence therebetween to actuate the warning circuit 205 for producing a warning signal in the form of sound or light. The exposure control mode, exposure information value, and maximum possible and exposed frame numbers set in the respective counters in the group 203 are displayed through the decoder driver 206 by the display device 207 visible from outside the camera body. The exposure mode and exposure information value set in the counter group 203 are once set in the register group 210. Of these exposure modes thus set, there are the storage time priority mode, diaphragm priority mode, storage time priority magic mode, diaphragm priority magic mode and program mode.

In the storage time priority mode, an input signal introduced from the photoelectric element 6 is memorized in the A/D converter 208, and then combined with the full open diaphragm value of the lens in the addition circuit 209. Then, the storage time value memorized in the register 210 is subtracted in the subtraction circuit 211. Then, the diaphragm value is introduced through the multiplexer 212 to the decoder driver 214, and is displayed by the display device 215 within the field of view of the finder. At the same time, the storage time value is also displayed after having passed through the multiplexer 212 and the decoder driver 214 to the internal display device 215. The diaphragm value computed here is fed to the comparison circuit 213. When this diaphragm value exceeds the limit of a range of diaphragm control, however, a warning signal is displayed through the decoder driver 214 by the internal display device. Again, though the diaphragm value is produced without further treatment, the storage time value is subjected to an actual time extension by the actual time extending circuit 218 in synchronism with the transfer pulse from the synchronizing signal generating circuit, and then produced as a signal for terminating the storing operation of the image transducer.

In the case of the diaphragm priority mode, because the value set in the register 210 stands for the diaphragm value, the brightness signal produced from the addition circuit 209 is subtracted by the diaphragm value in the subtraction circuit 211 to derive the storage time which is applied to the multiplexer 212. In the multiplexer 212, the preset and computed values are distributed to the diaphragm value and storage time value, and then after passing through the decoder driver are displayed by the internal display device 215 in a manner similar to that described in connection with the above described storage time priority mode. Again, the computed value of storage time is compared with the limit value of storage time by the comparison circuit 213 whose output is displayed by the internal display device through the decoder driver.

In the storage time priority magic mode the computation by the addition and subtraction circuits 209 and 210 and the selection of the data by the multiplexer 212 are similar to those in the storage time priority mode. But, when the output of the comparison circuit 213 indicates excess beyond the limit of diaphragm control, the preset value of storage time in the register 210 is automatically altered by the output of the comparison circuit 213 to effect a proper exposure. In the case of the diaphragm priority magic mode, such a procedure is similar to the above. Thus, when the computed value of storage time exceeds the limit of a control range, the preset value of diaphragm aperture is automatically altered by the output of the comparison circuit 213 to effect a proper exposure.

In the program mode, the brightness signal produced from the addition circuit 209 is applied directly to the multiplexer 212 without the recourse to the subtraction circuit, and is then divided to a diaphragm value and a storage time value in accordance with the predetermined program. These values are fed through the decoder driver 214 to the internal display device 215.

In flash photography, by attaching the flash device or when the main condenser is fully charged, the switch 207 is changed from the contact (a) to the contact (b) manually, or automatically. Then, the output of the photoelectric element is fed to the flash control circuit 216. In synchronism with the transfer pulse from the synchronizing signal generating circuit, the strobe is triggered to emit flash. The reflected light from the object is integrated by the circuit 216. When the integrated value has reached a predetermined level, a storage termination signal for the image transducer is produced. Regardless of whether daylight or flash photography is selected, the warning circuit 217 is operated each time a one-frame exposure is made thereby informing the operator of the concurrent state of operation, in the form of a warning sound or light from a light-emitting element. Then, when the recording of the video signals has been completed, the output of the timer circuit 307 is applied to the decoder driver 206, and a mark "OK" is displayed by the external display device 207.

Figure 9:
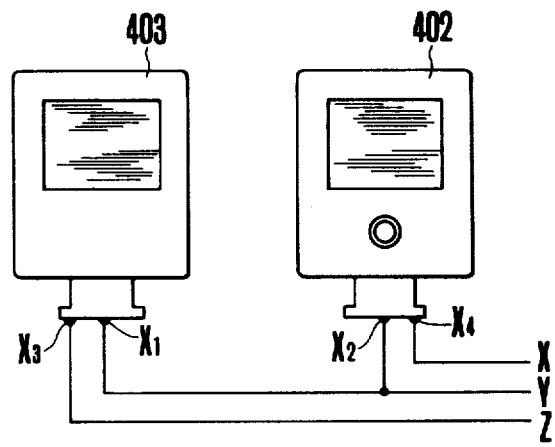
FIG. 9 illustrates the front and rear of a flash device for use with a circuit of FIG. 10.

FIG. 9 shows two practical examples of flash devices for use with the embodiment of FIGS. 8a to 8f. In FIG. 9, an ordinary flash device or strobe 403 includes a connection terminal X1 arranged to be connected to the synchronizing signal generating circuit 10 of FIG. 8(a). The aforementioned transfer pulse is fed through the terminal X1 to the inside of the strobe 403, and a trigger circuit of the strobe is actuated in synchronism with the transfer pulse. Another connection terminal X3 produces a strobe attach signal, for example, a charge completion signal for switching the switch SW207 of FIG. 10 to the contact (b). On the other hand, a so-called computer strobe 402 has a light-receiving element for light value computation. A connection terminal X2 of the strobe 402 triggers the strobe 402 by the transfer pulse in a manner similar to that of the strobe 403. Another terminal X4 receives the diaphragm value from the exposure computation control circuit 305 to control, for example, the size of aperture in front of the light-receiving element, or the amount of light produced from the strobe.

In operation of the flash device 403 the operator must first operate the diaphragm setting means to the manual mode, and then attach the strobe to the camera body. The strobe attach signal is then applied through the terminal X3 to the exposure computation control circuit to place the switch SW207 of FIG. 10 in the position (b). After that, when the shutter button is depressed, the above described operation proceeds by producing the transfer pulse from the synchronizing signal generating circuit 10. This initiates an image signal storing operation in the solid state image transducer. At the same time, the transfer pulse is fed through the terminal X1 to the strobe to trigger the strobe, and thereby produce a flash.

Since the object being photographed is illuminated with light from the flash device, the reflected light enters the lens 1 and strikes the photoelectric element 6. When the amount of flash light integrated by the integrator 216 of FIG. 10 has reached a predetermined level, a storage time termination signal is fed through the OR gate 220 of FIG. 10 to the synchronizing signal generating circuit 10. This produces the transfer pulse $V_{\phi P}$ in a manner similar to that described above. Thus, the storing operation of the image signal is completed. For this reason, it is possible to obtain a proper exposure control equivalent to that with the use of the computer strobe even with an ordinary strobe which lacks the light value computing function that controls the storage time in accordance with the light from the strobe.

In flash operation with the computer strobe 402, the strobe attach signal is not applied to the exposure computation control circuit 305, and therefore the above described daylight exposure mode remains unchanged. In this state, when the release button is depressed, the diaphragm signal is produced, as mentioned, to set the diaphragm of the camera. The size of diaphragm positioned in front of the light value computation light-receiving element, or the amount of light produced from the strobe is determined on the basis of the diaphragm signal value. After that, the above mentioned operation proceeds by producing the transfer pulse $V_{100 P}$ by which the strobe 402 is triggered to produce a flash. The light-receiving element of the strobe then performs the light adjusting operation by controlling the amount of light produced from the strobe in accordance with the computed flash exposure value. On the other hand, the storage time of the solid state image transducer is controlled in a manner similar to that in the daylight exposure mode. Therefore, even after firing of the strobe is stopped, the image transducer is further exposed for a time controlled in accordance with the preset value or computed value of storage time as in the daylight exposure mode. For this reason, use of the computer strobe results in so-called daylight synchro photography.

Figure 11C:
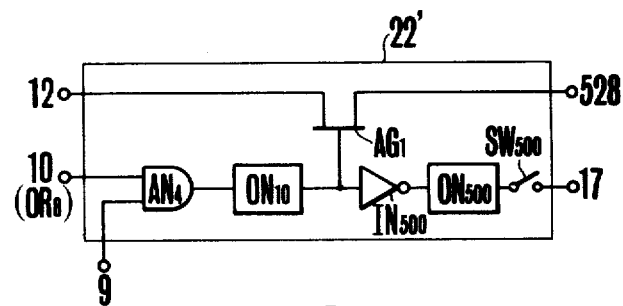
FIG. 11(c) illustrates the details of the circuit 22' of FIG. 11(a).
Figure 11A:
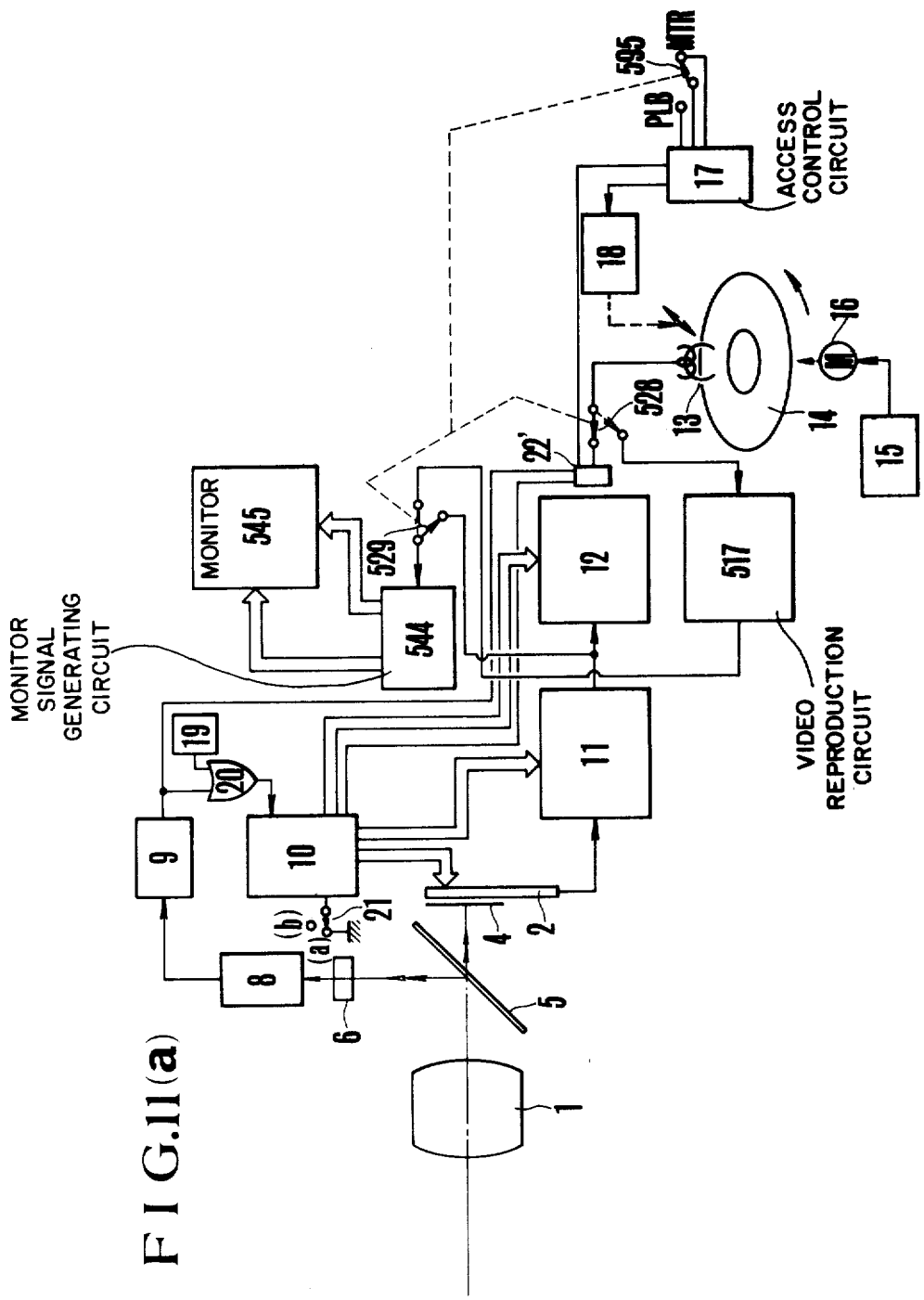
FIG. 11(a) is a block diagram of a further embodiment of the present invention.

FIG. 11(a) is a schematic view showing another embodiment of an image recording system according to the present invention. Here, the same reference numerals have been employed to denote parts similar to those shown in FIG. 1(a). This embodiment differs from the embodiment of FIG. 1 by providing a video reproducing circuit 517 for reading out the recorded image signals on the recording medium 14 through the head 13 and for reversely converting the image signals to NTSC signals, a monitor signal generating circuit 544 which receives the NTSC signals for producing signals forming a visible image in a monitor 545, and recording-reproducing selector switches 528 and 529 cooperative with each other to enable the reproduction of the recorded image.

Figure 12:
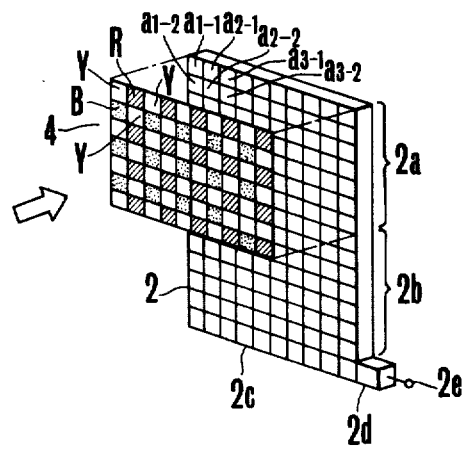
FIG. 12 is a schematic perspective view of the construction and arrangement of the constituent elements of the image sensing device and color filter of FIG. 11.

In this embodiment, the solid state image transducer 2 makes use of a so-called frame transfer type CCD consisting of an image sensing portion 2a and a storing portion 2b as shown in FIG. 12. In the solid state image transducer of FIG. 12, 2c a horizontal shift register 2c transfers the image signal stored in the storing portion 2b through an output diode 2d to an output terminal 2e. The light receiving portion 2a is constructed from a great number of minute photosensitive segments. The image output from the solid state image transducer of such construction is once transferred from the image sensing portion 2a to the storing portion 2b, while the arrangement relation is maintained unchanged, and then transferred by the horizontal shift register 2e line by line to the right as viewed in the figure. As a result, the component signals of the image output from the individual photosensitive elements are read out in sequence in a predetermined order.

The color filter 4 is divided into areas equal to those of the individual photosensitive elements, the areas Y being minute color filters whose transmissivity characteristic is selected so as to obtain the component Y serving as the brightness signal in the typical television standard, and the areas R and B being minute color filters whose transmissivity characteristics are so selected as to obtain respectively the component R (red) and B (blue) signals in the same television standard. Such areas are arranged Y-R-Y-R ... in each odd-numbered line, and B-Y-B-Y ... in each even-numbered line.

The image transducer 2 is also driven by the various pulses from the synchronizing signal generating circuit in a manner similar to that described in connection with FIG. 2. The construction of the video reproduction circuit 517 is known in the art, and an example of it is shown in FIG. 11(b).

Figure 11B:
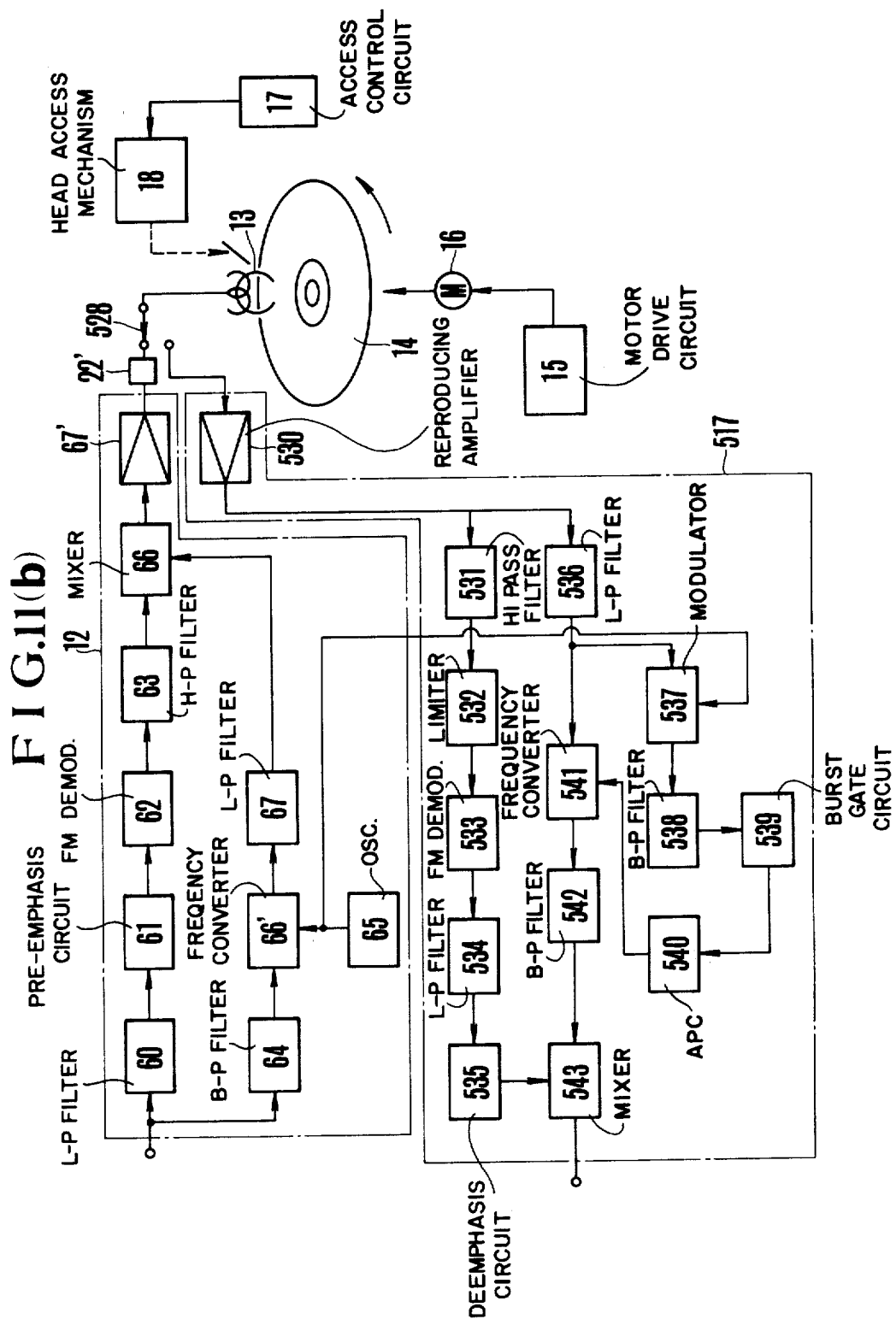
FIG. 11(b) is a block diagram illustrating the details of the video reproducing apparatus.

In FIG. 11(b), a video recording signal generating circuit 12 is the same as that in the embodiment of FIG. 5. When a switch 528 is operated for reproduction, the magnetic head 13 is connected to a reproducing amplifier 530 in the video reproducing circuit 517 enclosed within the dashed line block. The video signals read out by the head after having been amplified by the amplifier 530 are fed through a high pass filter 531, a limiter 532, an FM demodulator 533, a low pass filter 534 and a de-emphasis circuit 535 to be converted to a reproduced brightness signal. On the other hand, the video signals from the amplifier 530 are also applied to a low pass filter 536 where a color signal frequency band is extracted, then converted to a reproduced color subcarrier, then balance-modulated by the above described oscillator 65 in block 12 and a modulator 537 with conversion to the sum of their frequencies, and then processed through a band pass filter 538, burst gate circuit 539 and an APC circuit 540 to obtain a series of signals in phase synchronization with the color burst signals. The output of the low pass filter 536 also is applied to a frequency converter 541 where it is balance-modulated with the output signal of the APC circuit 540. Further, the difference between their frequencies is extracted by a band pass filter 542 to obtain the original color subcarrier. The thus-obtained brightness signal and color subcarrier are mixed by a mixer 543 to obtain a reproduced NTSC signal.

Figure 13A:
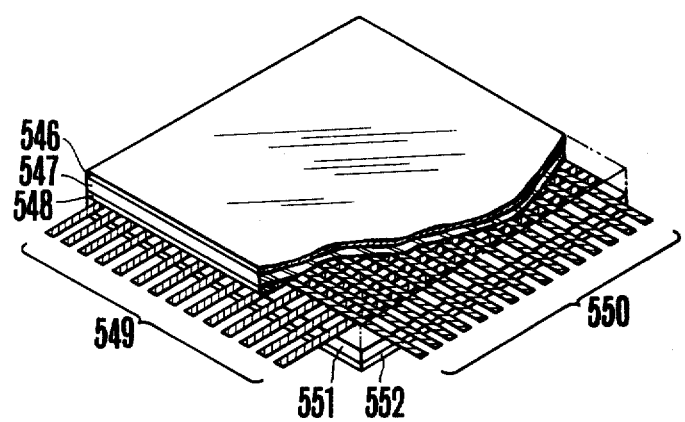
FIGS. 13(a) and 13(b) are perspective and sectional views respectively of the internal structure of a monitor with a portion broken away to illustrate the details.
Figure 13B:
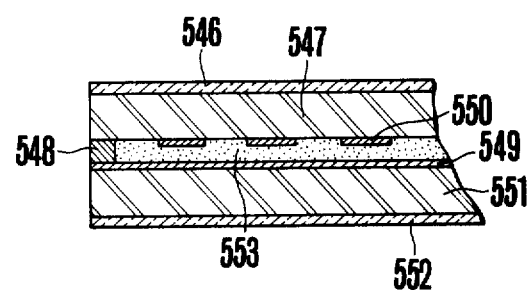
Figure 14:
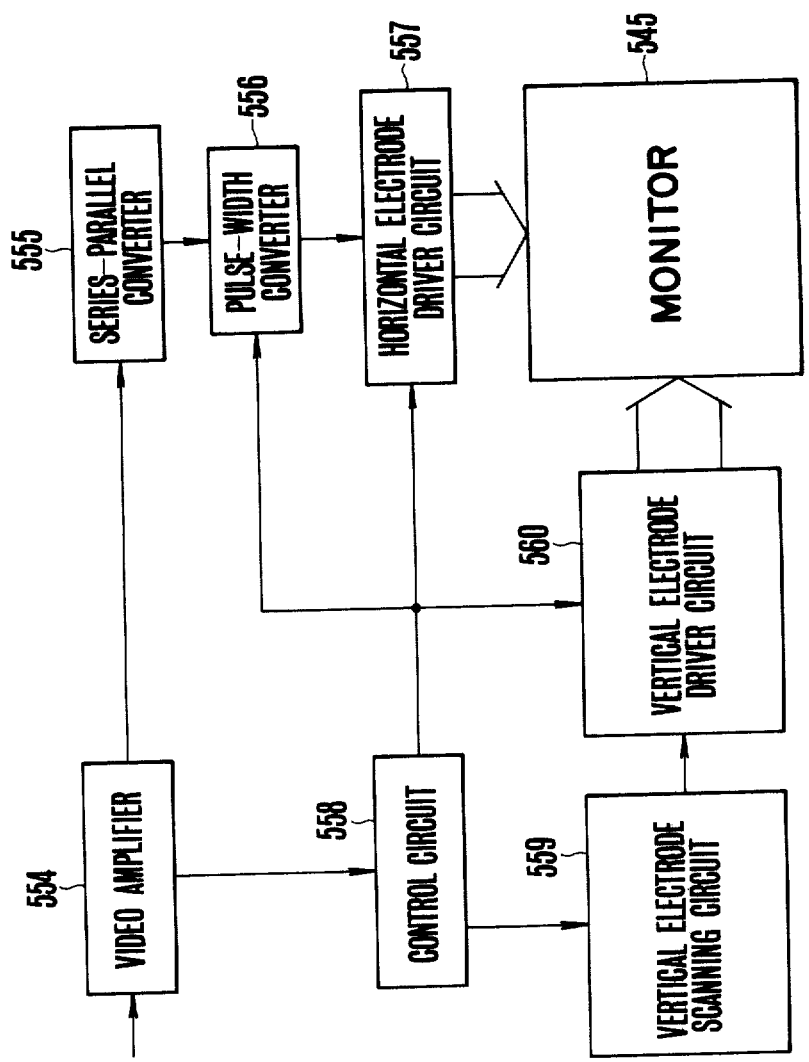
FIG. 14 is a block diagram of a practical example of a monitor signal forming circuit.

Examples of the monitor 545 and the monitor signal generating circuit 544 are shown in FIGS. 13(a), 13(b) and 14. These examples are shown as making use of a liquid crystal (hereinafter abbreviated as LC), a matrix display device and a signal generating circuit for driving the device. The monitor is, however, not confined thereto, and it is of course possible to use an ordinary display device such as CRT display, EL display, or plasma display. In FIGS. 13(a) and 13(b) the internal structure of the LC matrix is shown at (a) with a portion broken away, and the cross-sectional view of the same matrix is shown at (b). FIG. 13(a), shows a polarization plate A 546; a glass substrate A 547; a liquid crystal pack seal 546 vertical electrodes 549; horizontal electrodes 550; is a glass substrate B 551; and a polarization plate B 552. These parts are laminated in the above described order, and the liquid crystal is sealed between the vertical electrodes 549 and the horizontal electrodes 550 in the manner shown at 553 in FIG. 13(b).

With such a construction, external light is assumed to enter the matrix through the polarization plate A 546, become linearly polarized and then enter the liquid crystal 553. On the other hand, the two glass substrates A 547 and B 551 which sandwich the liquid crystal are provided with respective orientation layers (not shown) at their internal surfaces 90° relative to each other. For this reason, the sealed liquid crystal molecules are arranged to be distorted by 90° between the substrates. The linearly polarized light emerging from the polarization plate A is rotated 90° for the polarization axis by this liquid crystal molecule arrangement, before reaching the polarization plate B. Therefore, if the polarization axis of the polarization plate B is coincident with that of the polarization plate A, the light does not proceed beyond the polarization plate B. In other words, the liquid crystal cell looks dark. Now assuming that a specific pair of vertical and horizontal electrodes 549 and 550 is supplied with a voltage, then the liquid crystal in the cross area is orientated to a direction perpendicular to the both electrodes by the well known electrical field effect. As a result, the polarization axis in that area of the liquid crystal is no longer rotated, so that the linearly polarized light from the polarization plate A can be transmitted through the polarization plate B, and therefore, the liquid crystal cell looks bright. It is to be understood from the foregoing that the transmissivity of light, that is, brightness pattern can be varied by whether or not the voltage is applied between the selected pair of electrodes. By utilizing this principle, it is possible to display a visible image based on the above described NTSC signals after they have been converted to signals for the vertical and horizontal electrodes 549 and 550 by the monitor signal generating circuit 554.

FIG. 14 shows the details of the monitor signal generating circuit 554. In FIG. 14, a video amplifier 544 amplifier the NTSC signals up to a necessary level. This amplifier separates the video signals from synchronizing signals for scanning, and these signals are applied to a series-parallel converting circuit 555 and a control circuit 558 respectively. In the series-parallel converting circuit 555, the time sequential video signals are converted for only one scanning line to parallel output signals which are then applied to the horizontal electrodes 550 of FIG. 13 in synchronism with the horizontal synchronizing signals of the control circuit 558. A pulse width converting circuit 556 functions to increase the pulse width to a value necessary to obtain the satisfactory operation of the liquid crystal, as the voltage is applied for this time value. A vertical electrode scanning circuit 559 and a vertical electrode drive circuit 560 responsive to a scanning command signal from the control circuit 558 form signals for performing electrode scanning in the vertical direction. These signals are applied to the vertical electrodes 549 of FIGS. 13(a) and 13(b). The monitor signal generating circuit of such construction is disclosed, for example, in Nikkei Electronics p. 55 published Aug. 11, 1975 from Nikkei-McGraw Hill Inc.

Since the same parts in FIG. 11(a) as those in FIG. 1(a) are denoted by the same reference characters, their explanation is omitted. But, a gate circuit 22' is somewhat different from that in FIG. 1(i). Therefore, the gate circuit 22' will be described below. The cconstruction of the gate circuit 22' is shown in FIG. 11(c), where the same parts as those of the gate circuit shown in FIG. 1(i), use with the same reference characters. In FIG. 11(c), the difference resides in that there are provided an inverter IN500, a one-shot circuit ON500 and a switch SW500 arranged to be closed in cooperation with the switch 21 of FIG. 11(a) when in the continuous exposure mode. Because the gate circuit is constructed as above, the single frame exposure mode operates in the same manner as the circuit of FIG. 1(i). In the case of the continuous succession of one-frame exposures, however, each time the video signals for a one-frame image have been recorded, the one-shot circuit ON500 produces one pulse which is applied through the switch SW500 to an access circuit 17. By virtue thereof the position of the head 13 is automatically displaced track by track.

It is noted here that in the FIG. 11 embodiment, the switch SW1 and one-shot circuit 19 constituting part of the synchronizing signal generating circuit 10 are respectively turned on and triggered when one stroke of release is effected.

In operation of FIG. 11, when a continuous succession of one frame images are to be recorded, the operator will first depress the release button to the first step at which the access circuit 17 is actuated to regulate the position of the head 13. After that, upon further depression of the release button to the second step, the one-shot circuit 19 produces a pulse which is applied through the OR gate 20 to the synchronizing signal generating circuit 10. Then, the synchronizing signal generating circuit 10 produces drive pulses $V_{\phi P}$, $V_{\phi V1}$, $V_{\phi V2}$, $V_{\phi H1}$, $V_{\phi H2}$ and so on as in FIG. 1(a). Thus, an image signal stored on the image transducer 2 is read out, and another image signal after the release starts being stored. After that, described in connection with the circuit of FIG. 1(a), when the image signal reaches a proper exposure level, the circuit 9 produces a pulse by which a new image signal is initiated to be stored, while the image signal whose exposure level was regulated is initiated to be read out. Then, the pulse from the circuit 9 opens the gate circuit 22' for a time necessary to read out signals for the one-frame image, and the video signals are applied to the head 13, thereby a one frame image is recorded on the recording medium 14. Thus, the image signal is processed through the gate circuit 22' to be recorded by the head 13. When the recording operation of the one frame image has been completed, the output of the inverter IN500 in FIG. 11(c) changes to a high at which the one-shot circuit ON500 is triggered, and a pulse is fed through the switch SW500 to the access circuit 17, so that the head 13 is driven to advance one track. Thus, the head 13 is made ready for recording the next one-frame image. Such procedure repeats itself for every one pulse produced from the circuit 9. Therefore, a continuous succession of one-frame images are recorded on respective tracks on the recording medium 14. At the same time as that at which the image signal is recorded, the NTSC signal from the image signal processing circuit 11 is applied through the switch 529 to the monitor signal generating circuit 544. Thus the image can be monitored by the display device 545 while the same image is recorded simultaneously. In the case of the single frame exposure, each time one actuation of release is effected, the position of the head 13 is renewed to permit the signals for a one-frame image to be recorded in a respective track for one actuation of release as in the above described embodiment of FIG. 1(a). Thus, the recording operation of image signals is performed as such.

In the reproducing mode, a dial for the access circuit 17 of FIG. 11(a) is positioned to connect to the playback position, which shifts the switches 528 and 529 to their positions illustrated by dashed lines. Then, the one of the tracks which is to be reproduced is assigned by the access circuit 17 to determine the position of the head 13. As the motor 16 is rotated, the signals recorded on the recording medium 14 are detected by the head 13 and then fed through the switch 528 to the video reproducing circuit 517, where they are converted to NTSC signals. These converted NTSC signals are applied through the switch 529 to the monitor signal generating circuit 544, so that the recorded images are monitored by the monitor 545 in the above described manner.

Figure 15:
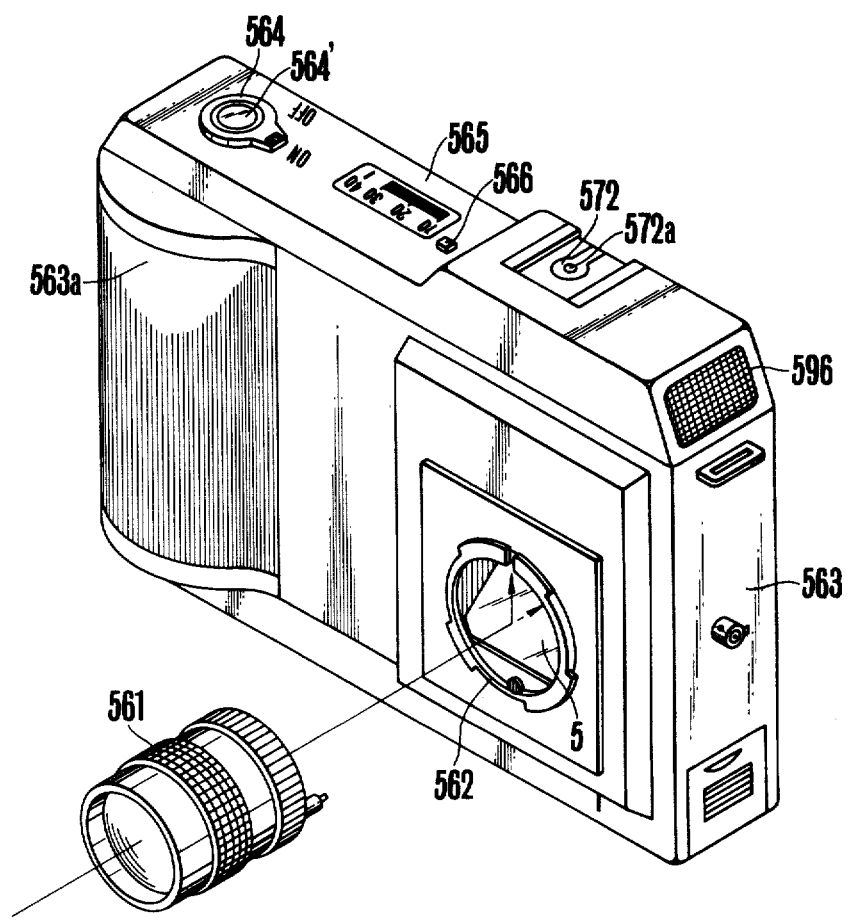
FIG. 15 is a perspective view of the front exterior of an electrophotographic camera employing the system of the invention.
Figure 16:
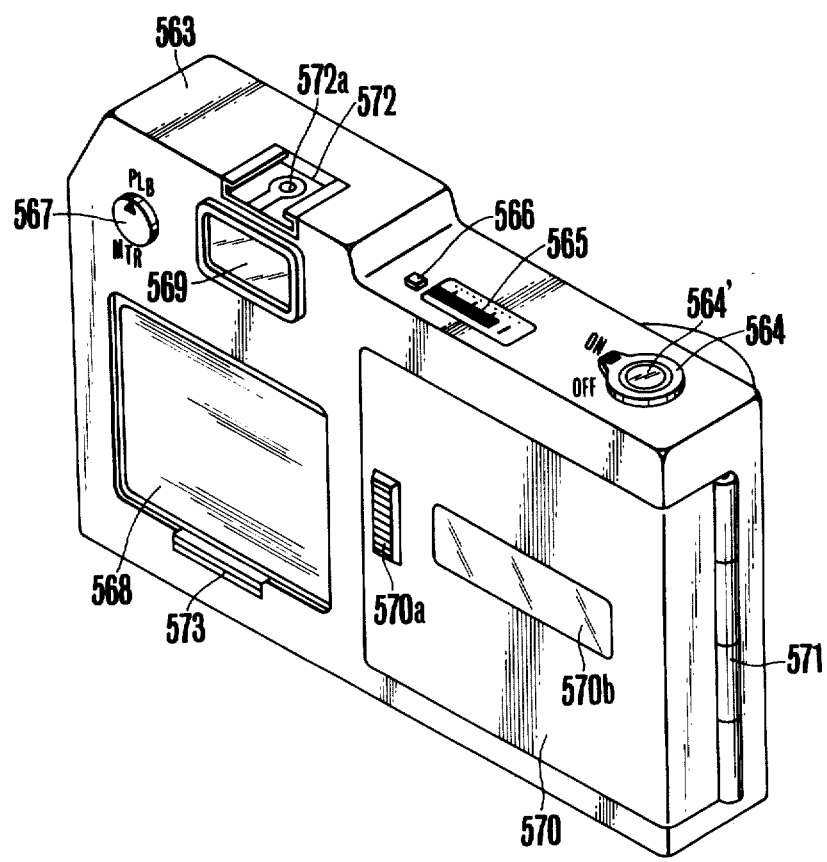
FIG. 16 is a similar view of the rear of the camera of FIG. 15.
Figure 17:
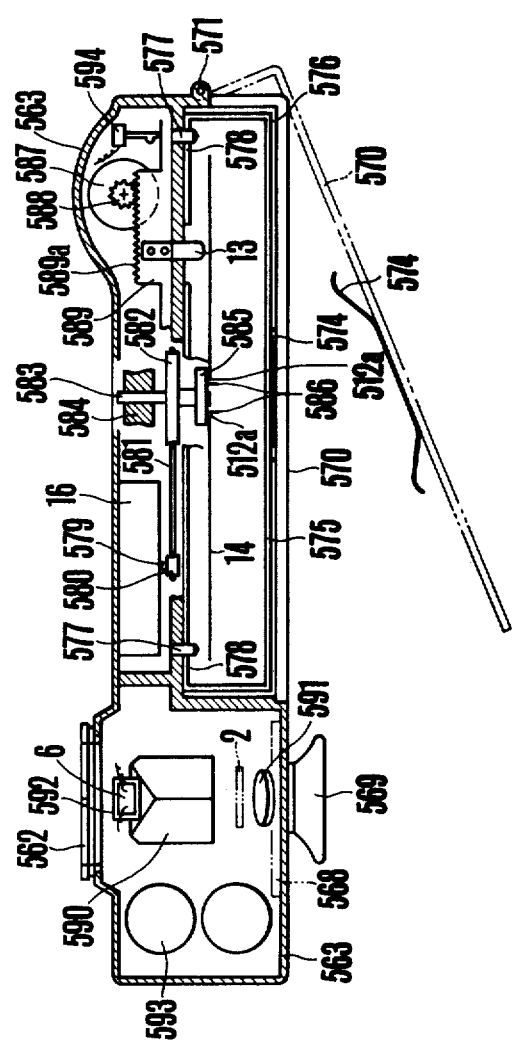
FIG. 17 is a partially top plan partially horizontal sectional view of the camera of FIGS. 15 and 16.

FIGS. 15, 16 and 17 show an example of a practical form of a camera having incorporated therein the image recording system of the present invention. FIG. 15 is a perspective view of the camera looking from the front, FIG. 16 is a perspective view of the same from the rear, and FIG. 17 is a horizontal cross-sectional view of the same. In FIG. 15, an ordinary interchangeable objective lens 561 is provided with various operating members necessary for ordinary photography such as a distance adjusting ring and diaphragm ring. A mount 562 formed in a portion of the camera body 563 is engageable with the rear wall of the interchangeable lens 561. A half-mirror 5 is the one shown in FIG. 11(a). A grip 563a is formed in a portion of the camera body to facilitate holding of the camera by hand. The camera further includes an electric power switch 564, and a release switch 564' arranged in coaxial relation to the rotary shaft of the power switch. A head access command device 565 includes a liquid crystal type analogue display arranged, so that upon depression of a control button 566 it displays the addresses of the recorded images in sequence beginning with No. 1. Upon presentation of a desired address, the operator removes his finger from the control button 566. This permits the image recorded in that address to be reproduced and monitored, because the head 13 is accessed to the track for the image recorded therein. A recording-reproduction changeover dial 567 serves for simultaneously switching the switches 528 and 529 of FIG. 11.

When the head access command device 565 is operated for reproduction, that is, when the dial is set in PLB position illustrated the above described function is effected. But when the camera is set in the image recording mode, that is, when the dial 567 is set in MTR position illustrated, the liquid crystal type analogue display serves as a frame counter. In this case, even when the button 566 is depressed, the display is not affected. The camera also includes an LC matrix display device 568 described in connection with FIG. 13 and a shutter 573 for protecting the image display surface from contamination and mechanical shock when not in use. In FIG. 15, the shutter is shown open.

An optical finder eye-piece may be used for the purpose of saving the electrical energy of the battery, or because of the difficulty of utilizing the LC matrix display for some reason. This optical finder is known in the art. In connection with FIG. 11(a), the eye-piece may be positioned in the path of light reflected from the half-mirror 5 as can be seen in the single lens reflex camera. In this case, the photoelectric element 6 may be arranged with a supplementary prism on a penta-dach prism at one surface thereof as shown in FIG. 17. A cover 570 is for a cartridge chamber into which a cartridge containing the above described image recording medium is inserted. The cover 570 is hinged to the camera body at 571, and has a lock member 570a and a window 570b with a transparent plastic plate for recognizing whether or not a cartridge is loaded in the chamber. A shoe 527 serves attachment of a flash device provided with electrical connection terminals 572. A buzzer 569 informs the operator of the fact that the solid state image transducer is in operation for charge accumulation, thereby making the camera operation very convenient because camera shake is avoided during the exposure operation.

FIG. 17 is a sectional view of the above described camera. The cartridge chamber 576 is provided with a spring 574 for pressing the cartridge 575. When the cover 570 is closed, the cartridge is seated in an accurately regulated position. In the cartridge 575, the already mentioned image recording medium 14 such as a video disc is maintained in contact with the magnetic head 13 when the cartridge is set in the illustrated position. A position adjusting pin 577 is fixedly mounted on the camera body at a portion thereof to adjust the position of the cartridge in engagement with a hole 578 formed in the casing thereof.

The motor 16 serves for rotating the above described image recording medium 14. In this example, from the camera construction standpoint, the motor is shown in the flat form. A small pulley 580 is fixed to an output shaft 579 of the motor. A rotary shaft 583 is rotatably mounted on a bearing 582, and has a large pulley 582 fixedly secured thereto. A rotary base 585 is formed in unison with the shaft 583 and carries pins 586 arranged to engage a hole 512a for rotation of the image recording medium 14. In this mechanism, the motor 16 is supplied with an electrical power controlled by the above-described motor drive circuit 15 to rotate at a predetermined speed. Motion of the motor 16 is transmitted through the pulley 580, belt 581, and pulley 582 to the rotary base 585 which drives the image recording medium 14 and rotates it at a constant speed record or reproduce images.

In the head access mechanism 18, a slide member 589 is provided with a rack 581 engaging a pinion 588 which is fixedly mounted on the shaft of the motor 587. Because the slide member 589 is formed in unison with the head 13 as the motor 587 is rotated in a forward or reversed direction, the head 13 is moved on the image recording medium 14. Therefore, the motor is rotated by the control signal from a head access circuit to be described later, and a random access operation of the head is performed. The motor 587 is preferably a pulse motor for the purpose of facilitating the control operation.

A penta-dach prism forms part of the optical finder. A small prism 592 is affixed to a portion of the prism 592. Positioned on the small prism 592 is the photoelectric element 6 to receive light entering through the penta-dach prism and the small prism. The camera also includes the already described solid state image transducer 2, LC matrix display device 568, and a battery 593.

Figure 18:
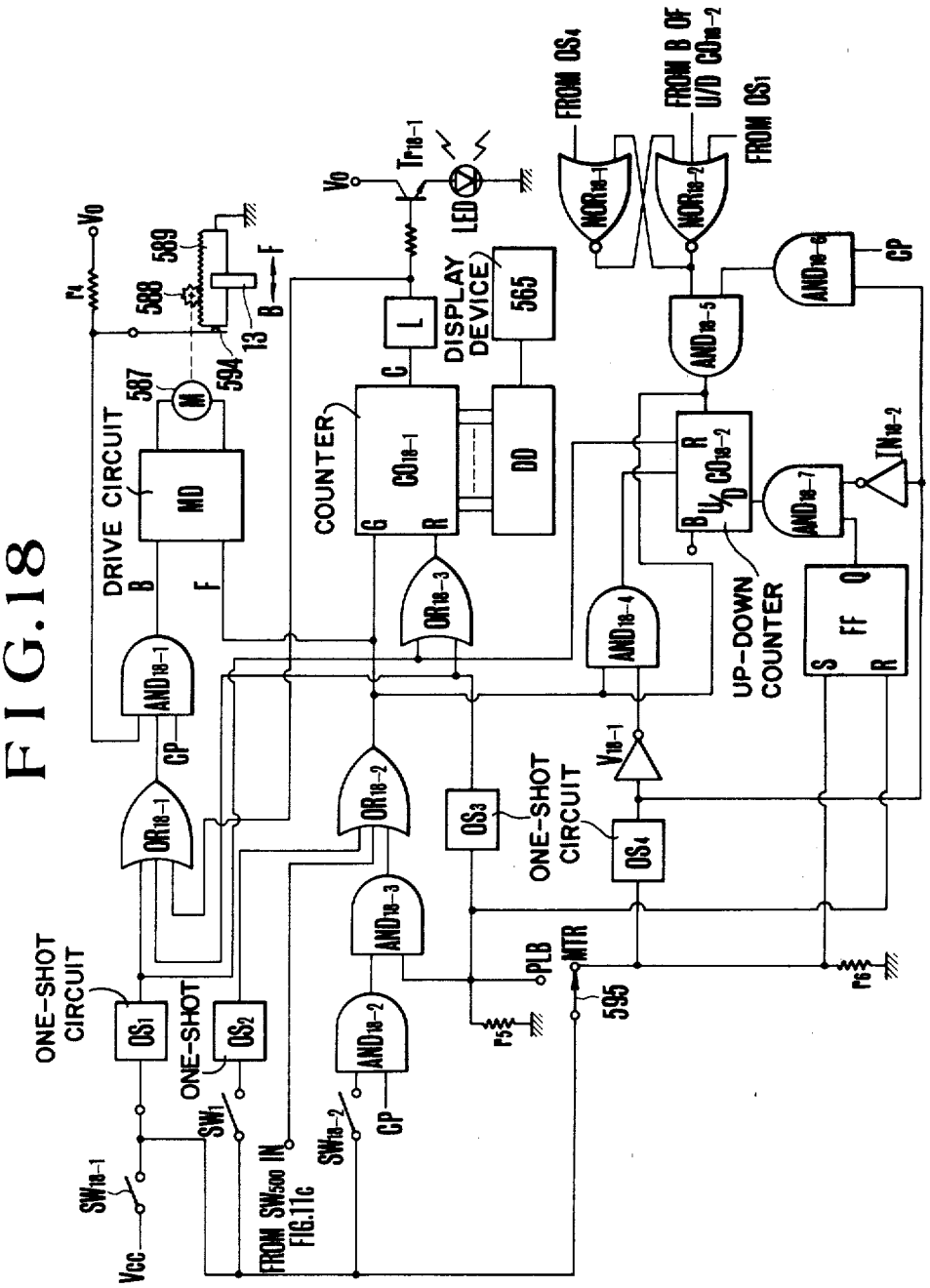
FIG. 18 is a circuit diagram illustrating the details of the head access circuit of FIG. 1.

FIG. 18 is a block diagram showing the construction of a head access circuit 17. Here, a one-shot multivibrator OS1 produces a single pulse in response to the output $I_1$ of a switch SW18-1 which is arranged to produce a high level signal when the cartridge 575 is inserted into the camera 563. The output of the OS1 is supplied as an input of an OR gate OR 18-1. The output of the OR 18-1 is supplied as an input of an AND gate AND 18-1. The output of said gate AND 18-1 causes the motor 587 rotate in the reverse direction. Elements 588 and 589 are the above described head access mechanism including the head 13. A switch 594 is grounded when the slide member 589 is moved in the direction indicated by an arrow B to a point just before the first recording track on the image recording medium 14.

The operation of the system of FIG. 18 is as follows: When the cartridge 575 is inserted into the camera 563, the switch SW 18-1 is closed causing the one-shot multivibrator OS1 to produce a pulse which is applied through the OR 18-1 to the AND 18-1. Since the switch 594 is OFF, a high level signal is applied through a resistor r4 to the AND gate AND 18-1 at one input thereof. As a result a clock pulse train is allowed to pass through the gate AND 18-1 to a drive circuit MD at a reverse rotation input B thereof. A pulse motor rotation direction control circuit MD known in the art, for example, comprises four transistors. As the clock pulse enter the circuit MD, the motor 587 is rotated in the reverse direction to drive the head access mechanism for movement toward the direction B in synchronism with the CP until the switch 594 is closed. When the AND 18-1 is gated off, the motor 587 is stopped.

The width of the pulse from the one-shot OS1 is pre-adjusted to a time slightly longer than that necessary to move the head access mechanism over the entire access range. On the other hand, the above mentioned pulse from the OS1 is also applied to a counter CO 18-1 at a reset terminal thereof through an OR gate OR 18-3, thereby the counter CO 18-1 is reset. The pulse is also applied to a reset input terminal of an U/D counter CO 18-2, so that the U/D counter CO 18-2 is reset. Because the switch SW 18-1 is closed to apply a voltage Vcc to the terminal of the switch 595, when the switch 595 cooperating with the recording-reproduction changeover dial 567 is set in the recording position MTR, a high level signal is applied to the one-shot circuit OS4 and the set terminal of a flip-flop FF, so that the one-shot circuit OS4 is actuated to produce a pulse and the flip-flop FF is set. Then, the pulse from the one-shot circuit OS4 is applied to an AND gate AND 18-6, causing clock pulses to be applied through the AND gate AND 18-6 to an AND gate AND 18-5. Since one of the inputs of a NOR gate NOR 18-2 is connected to the output of the one-shot circuit OS1, and the output of the NOR gate NOR 18-2 is low, the AND gate AND 18-5 is gated off.

Because the pulse width of the one-shot circuit OS1 is set longer than that of the one-shot OS4, the AND gate AND 18-5 is closed during the time the one-shot OS1 produces a high level output. Accordingly, the forward rotation input terminal F of the drive circuit MD receives no drive pulse. Thus, the drives MD drives the motor 587 to rotate in the reverse direction as mentioned, and the head 13 is moved in the direction B only.

After that, when the release button 564' is depressed, the switch SW1 is closed, causing the output of an I2 to change to a high at which the one-shot OS2 produces a pulse. This pulse is fed through an OR gate OR 18-2 to the counter CO 18-1. The counter CO 18-1 advances one count, while the motor is driven to rotate in the forward direction F by a predetermined angular distance, as the pulse from the one-shot OS2 is applied to the forward rotation input terminal F of the control circuit MD. Thus, the head 13 is moved in the direction F to the first track. Then, as mentioned, a first image signal is recorded in this first track. It is noted that the display device 565 represents "1".

At this time, since the pulse from the OS4 was vanished, the inverter V 18-1 produces a high output which causes the AND gate AND 18-4 to permit the pulse from the one-shot circuit OS2 to be fed to the U/D counter CO 18-2. Since the AND gate AND 18-7 produces a high signal, the U/D counter counts UP. Thus, each time the pulse from the one-shot circuit OS2 for every one actuation of release is produced, the position of the head 13 is shifted one track. At the same time, this pulse is counted by the counter CO 18-1 to display the number of frames exposed. In this manner, a series of images are recorded by the head on the respective tracks on the recording medium, while the number of frames recorded is displayed.

During this recording operation, when the operator desires to reproduce any one of the recorded images, the dial 567 is moved to the PLB position where the switch 595 is connected to the contact PLB. In this state, a high level signal appears at the reset terminal R of the flip-flop FF. Thus, the flip-flop is reset. Since the AND gate AND 18-7 produces a low signal, the U/D counter CO 18-2 counts DOWN, and the one-shot circuit OS3 is triggered to produce a pulse. During a time equal to the width of this pulse, the OR gates OR 18-1 is open, causing the head to be moved to a point just before the first track on the recording medium as mentioned. Again, the output of the one-shot circuit OS3 is applied to the reset input of the counter CO 18-1, so that the counter is reset, and the display device 565 is also reset. An input terminal 13 is connected to the switch SW 18-2 which is arranged to be closed when the button 566 is depressed. So long as the button 566 is depressed, the AND gate AND 18-2 is opened in synchronism with the clock pulses CP, and at the same time, the AND gate AND 18-3 is opened, and the OR 18-2 is also opened. Therefore, the number of pulses occurring during the time when the button 566 is depressed is counted by the counter CO 18-1 to move the head access mechanism in the direction indicated by arrow F. When a desired image number is presented, the operator will immediately release the button 566 from the depression to stop the OR 18-2, so that the head 13 registers with the corresponding recording track. Then, a reproducing operation is performed in the manner described. In the image reproducing state, even when the release 564' is depressed, the OR gate OR 18-2 becomes open as mentioned, so that the head is accessed for one-frame image. As a result, the function corresponding to the one-frame advance can be realized. On the other hand, in this state, the AND 18-4 is open, and the U/D counter CO 18-2 counts DOWN. In response to the access pulse, the counter CO 18-2 holds a number of counts equal to that obtained by subtracting the address number from the maximum number of frames recorded.

Next, in order to record images again, the switch 595 is again switched to the MTR position, so that the AND 18-6 is actuated to pass clock pulses CP therethrough only during the gate AND time when the one-shot SO4 produces a pulse. On the other hand, the output of the one-shot circuit OS4 is fed to the NOR gate NOR 18-1 which produces a low output. The NOR gate NOR 18-2 now produces a high output. Therefore, the AND gate AND 18-5 passes the clock pulses from the AND gate AND 18-6 to the U/D counter CO 18-2. At this time, in response to the pulse from the one-shot circuit OS4, the counter CO 18-2 counts the pulses down to "0", that is, a borrow output is produced. When the borrow output is produced in this manner, the output of the NOR gate NOR 18-2 changes to a low at which the AND gate AND 18-5 is closed. Again, since the output of the AND gate AND 18-5 is connected to the counter CO 18-1 and the input terminal F of the drive circuit MD, the head is returned a distance corresponding to the number of pulses produced by the AND gate AND 18-5 in the direction F to the position which was occupied by the head before the reproduction. Now assuming that, for example, after ten frame images were recorded, the 6th image was reproduced, a recording operation for the 11th image will be succeeded as follows: Since the ten frame exposures were made, the counters CO 18-1 and U/D CO 18-2 both count ten, and the head 13 also assumes a position corresponding to that content of the counter CO 18-1. Then, when the switch 595 is set to the PLB position, the content of the counter CO 18-1 becomes "0", and the head is also returned to the initial position. Then, the switch SW 18-2 is closed until six pulses are fed to the counter CO 18-1. When the content of the counter CO 18-1 becomes 6, the head is moved 6 tracks. On the other hand, the above described 6 pulses are also applied to the U/D counter CO 18-2, so that the content of the U/D counter CO 18-2 is changed from 10 to 4. Then, when the switch 595 is again set to the MTR position after the reproduction, the counter AND 18-5 produces pulses until the content of the U/D counter CO 18-2 becomes "0". Since the content of the U/D counter CO 18-2 was 4, four pulses from the AND gate AND 18-5 are produced so that the content of the U/D counter CO 18-2 becomes "0". Therefore, the counter CO 18-1 advances 4 counts with the resulting content becoming 10, and the head is registered with the 10th track. Thus, the system is reset to the intermediate recording state. After that, each time one actuation of release is effected, the above described operation repeats itself.

When the counter CO 18-1 reaches the full count state, that is, when no more fresh tracks are available on the image recording medium 14, the counter CO 18-1 produces a carry C which is latched by a latch circuit L. By this latch signal, the gate OR 18-1 is opened to reset the head access mechanism to the initial position, and a warning circuit comprising a transistor Tr 18-1 and LED is actuated to inform the operator of the fact that all the tracks on the recording medium 14 are used up to record the images. In the figure, r4, r5 and r6 are resistors for insuring that upon reception of the battery voltage Vcc, the circuit can take either a high or a low level. If some of the recorded images are found to be unvalued as the images are reproduced by the monitor, the unvalued images may be erased in a manner known in the art, for example, by using an erasing head. It is noted that the continuous succession of exposures is performed by closing the switch SW500 of the gate circuit. Therefore, each time one-frame exposure is made, one pulse from the one-shot circuit ON500 is fed to the OR gate OR 18-2. Thus, the head is automatically advanced in position.

As has been described in detail, according to the present invention, the image recording system has many valuable advantages not only that as the storage time of the image signal on the solid state image transducer is controlled in accordance with the brightness, the image signals are always recorded in the proper exposure level to enable reproduction of images of optimum tone quality, but also that as the exposure is controlled by taking into account the storage time, it is very simply made possible to perform the various exposure modes such as the both priority mode, program mode and magic mode, and that by using the ordinary strobe, the daylight synchro photography with the so-called computer operation can be performed very easily. Again, according to the present invention, it is made possible not only that new functions such as the electronic monitor of images to be recorded, and the instant reproduction of the recorded images can be incorporated in a compact camera structure, but also that unlike the general VTR system of large bulk and size, for example, little unfamiliarity is given to the operator as compared with the ordinary camera from the standpoint of manageability. Again, according to the present invention, in addition to the essential feature that since the object image is detected by the solid state image transducer, the recording of the object images without the use of movable parts is realized, as the charge accumulation time of the same transducer can vary over a very wide range from about 1 μsec. to a few seconds, the accomplishment of an exposure control method that allows for giving full scope to this characteristic leads to realize an image recording system having an extremely wide dynamic range of exposure control, as the storage time corresponds to the shutter time in the ordinary camera.

Further, the solid state image transducer may be designed to have a desired area ratio of the photosensitive portion to the transfer registers for the purpose of controlling the sensitivity of the transducer. Speaking in terms of the conventional camera art, an effect equivalent to the use of different film sensitivities is produced. By employing a solid state image transducer designed to allow for about ASA800 in the system of the invention, in addition thereto, a wide range of shutter speeds from 1 μsec. to a few seconds is realized. According to the present invention, therefore, an extremely large performance that is essentially impossible in the conventional camera can be achieved.

What is claimed is:

1. An image recording system comprising:
   (a) an optical-electronic image transducer having storage capability for storing an optical image as an electrical signal;
   (b) release means;
   (c) a release signal forming circuit for producing a release signal when said release means is actuated;
   (d) an exposure control timer circuit operative in response to said release signal, said timer circuit including a light-receiving element, said timer circuit being arranged for producing signals at time intervals based on the brightness of light received at said light receiving element;
   (e) a control circuit coupled to said image transducer, said control circuit being arranged to cause said image transducer to begin a storing operation in response to said release signal, said control circuit being further arranged to have said storing operation stopped in response to a signal of said timer circuit and to have another storing operation commenced so that the storing operation can be carried out in a continuously repeating manner at time intervals defined by said timer circuit;
   (f) a recording circuit for recording the optical image stored during a time regulated by said timer circuit; and
   (g) a mode control circuit for switching between first and second modes, said recording circuit being arranged to perform a recording operation in a continuously repeating manner every time a signal of said timer circuit is produced in the first mode and to singly perform the recording operation in response to each issue of a signal produced by said timer circuit in the second mode.

2. An image recording system according to claim 1, wherein said system has light-shielding means for preventing light from entering into the image transducer, and for shielding light entering the image transducer after completion of the storing operation.

3. A system for performing a flash exposure with a flash device having light measuring means that measure a flash of light reflected by an object to be photographed and is arranged to produce a signal when the amount of the light measured by said light measuring means reaches a predetermined value, said system comprising:
   (a) an optical-electronic image transducer having storage capability for storing an optical image as an electrical signal;
   (b) a release; a control circuit coupled to said transducer, said control circuit being arranged to have a storing operation commenced by said transducer in response to the operation of said release, said control circuit being further arranged to have said storing operation stopped in response to the signal produced by said flash device; and
   (c) trigger signal producing means arranged to transmit a trigger signal to said flash device to have said flash device generate a flash of light in synchronism with the storing operation performed by said transducer.

* * * * *